(12) United States Patent
Wang et al.

(10) Patent No.: US 11,218,988 B2
(45) Date of Patent: Jan. 4, 2022

(54) PAGING DETERMINING METHOD AND APPARATUS

(71) Applicant: HUAWEI TECHNOLOGIES CO., LTD., Guangdong (CN)

(72) Inventors: Da Wang, Shenzhen (CN); Jian Wang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 91 days.

(21) Appl. No.: 16/610,688

(22) PCT Filed: May 5, 2017

(86) PCT No.: PCT/CN2017/083352
§ 371 (c)(1),
(2) Date: Nov. 4, 2019

(87) PCT Pub. No.: WO2018/201499
PCT Pub. Date: Nov. 8, 2018

(65) Prior Publication Data
US 2021/0160814 A1    May 27, 2021

(51) Int. Cl.
*H04W 68/00*    (2009.01)
(52) U.S. Cl.
CPC ................... *H04W 68/005* (2013.01)
(58) Field of Classification Search
CPC .................................. H04W 68/005
USPC ....................................... 455/458
See application file for complete search history.

(56) References Cited

U.S. PATENT DOCUMENTS

| 2013/0102311 A1* | 4/2013 | Park ............. H04W 68/02 455/435.1 |
| 2013/0148607 A1 | 6/2013 | Yinghuiyu et al. |
| 2015/0103768 A1 | 4/2015 | Chen et al. |
| 2016/0345294 A1 | 11/2016 | Bennett et al. |

FOREIGN PATENT DOCUMENTS

| CN | 102281502 A | 12/2011 |
| CN | 103200680 A | 7/2013 |
| CN | 103378939 A | 10/2013 |
| CN | 104797007 A | 7/2015 |

(Continued)

OTHER PUBLICATIONS

R2-156561 Sony,"Reduction of Paging Message Reading on PDSCH",3GPP TSG-RAN WG2 Meeting #92,Anaheim, USA, Nov. 16-20, 2015,total 4 pages.

(Continued)

*Primary Examiner* — Tanmay K Shah
(74) *Attorney, Agent, or Firm* — Westerman, Hattori, Daniels & Adrian, LLP

(57) ABSTRACT

Embodiments of the present invention provide a paging determining method. The method includes: determining, by a network device, a first group to which a first terminal device paged on a first paging occasion belongs, where the first group belongs to the M groups; and sending, by the network device, control information based on the first group, where the control information is used to indicate paging information, and the paging information includes a device identifier of the first terminal device. Therefore, reduction of terminal device power consumption can be effectively supported.

16 Claims, 7 Drawing Sheets

(56) References Cited

FOREIGN PATENT DOCUMENTS

| CN | 105992363 A | 10/2016 |
|---|---|---|
| EP | 2844010 A1 | 3/2015 |
| JP | 2010517478 A | 5/2010 |
| WO | 2016114215 A1 | 7/2016 |
| WO | 2016162051 A1 | 10/2016 |
| WO | 2017/026188 A1 | 2/2017 |
| WO | 2017101102 A1 | 6/2017 |

OTHER PUBLICATIONS

R1-1704290 Huawei, HiSilicon,"On 'wake-up signal' for paging and connected-mode DRX",3GPP TSG RAN WG1 Meeting #88bis, Spokane, USA, Apr. 3-7, 2017,total 4 pages.

R2-154529 Samsung Electronics,"Discussion on Paging Mechanism",3GPP TSG RAN2 #91bis,Malmo, Sweden, Oct. 5-9, 2015,total 6 pages.

R2-154507 Huawei, HiSilicon,"NB-IOT—Design of Message Reading Indicator",3GPP TSG-RAN WG2 #91BIS,Malmo, Sweden, Oct. 5-9, 2015,total 4 pages.

Extended (Supplementary) European Search Report dated Apr. 9, 2020, issued in counterpart EP Application No. 17908566.7. (10 pages).

3GPP TS 36.331 V14.2.2 (Apr. 2017); 3rd Generation Partnership Project; Technical Specification Group Radio Access Network; Evolved Universal Terrestrial Radio Access (E-UTRA); Radio Resouice Control (RRC);Protocol specification Release 14); total 721 pages.

3GPP TS 36.304 V14.2.0 (Mar. 2017), 3rd Generation Partnership Project; Technical Specification Group Radio Access Network; Evolved Universal Terrestrial Radio Access (E-UTRA); User Equipment (UE) procedures in idle mode (Release 14), Mar. 2017. total 49 pages.

R1-1701723 Huawei et al.,"Multi-beam Paging for NR", 3GPP TSG RAN WG1 Meeting #88, Athens, Greece, Feb. 13-17, 2017,total 4 pages.

International Search Report dated Jan. 30, 2018, issued in counterpart application No. PCT/CN2017/083352, with English translation. (16 pages).

3GPP TS 36.304 V12.6.0 (Sep. 2015),3rd Generation Partnership Project;Technical Specification Group Radio Access Network;Evolved Universal Terrestrial Radio Access (E-UTRA); User Equipment (UE) procedures in idle mode (Release 12),total 38 pages.

R1-1705570 Qualcomm Incorporated,"Paging design consideration",3GPP TSG-RAN WG1 #88bis,Apr. 3-7, 2017, Spoakne, USA,total 8 pages.

R2-1702780 Nokia, Alcatel-Lucent Shanghai Bell,"Evaluation of Uplink Access using Paging Indicators",3GPP TSG-RAN WG2 Meeting #97bis,Spokane, USA, Apr. 3-7, 2017,total 5 pages.

Office Action dated Nov. 24, 2020, issued in counterpart JP Application No. 2019-560292, with English Translation. (19 pages).

Office Action dated May 6, 2021, issued in counterpart CN Application No. 201780090135.3, with English Translation. (33 pages).

Office Action dated Feb. 19, 2021, issued in counterpart IN Application No. 201937045840, with English Translation. (5 pages).

* cited by examiner

| Group #1 | Group #2 | Group #3 | Group #4 | Group #5 | Group #6 | Group #7 | Group #8 |
|---|---|---|---|---|---|---|---|
| 0 | 0 | 0 | 1 | 0 | 1 | 0 | 0 |

PAGING DETERMINING METHOD AND APPARATUS

CROSS-REFERENCE TO RELATED APPLICATIONS

This application is a National Stage of International Application No. PCT/CN2017/083352, filed on May 5, 2017, which is hereby incorporated by reference in its entirety.

TECHNICAL FIELD

Embodiments of the present invention relate to the communications field, and more specifically, to a paging determining method and apparatus in the communications field.

BACKGROUND

Currently, a terminal device paging method is known. In an existing Long Term Evolution (Long Term Evolution, LTE) system, paging information is carried on a downlink data channel. A network device indicates, by using downlink control information DCI, the downlink data channel carrying the paging information. The paging information includes a device identifier of a paged terminal device (for example, a device identifier ID of user equipment UE). Based on a system configuration, a terminal device wakes up on a paging occasion of the terminal device to listen to the DCI. If the terminal device obtains the DCI through listening, the terminal device receives the downlink data channel based on the DCI, to obtain the paging information. If the paging information includes a device identifier of the terminal device, it indicates that the network device pages the terminal device, and the terminal device subsequently accesses a network. If the paging information does not include the device identifier of the terminal device, it indicates that the network device is not paging the terminal device, and the terminal device subsequently enters a sleep state.

In a future 5G system, paging information is sent together with a synchronization channel. In comparison with the LTE system, paging occasions in the 5G system are less than those in the LTE system. This means that more terminal devices are paged on each paging occasion.

However, a downlink data channel used to carry a paging information has a limited quantity of resources. In other words, for one downlink data channel, each piece of paging information includes a limited quantity of device identifiers of paged terminal devices. In addition, a plurality of terminal devices wake up on one paging occasion to listen to DCI. Because a paging information includes a limited quantity of device identifiers of paged terminal devices, after the terminal devices obtain the DCI through listening, only some terminal devices can determine, from the paging information, that the terminal devices are paged, while the other terminal devices determine, from the paging information, that the terminal devices are not paged. Consequently, the other terminal devices increase power consumption.

Therefore, a technology needs to be provided to reduce terminal device power consumption.

SUMMARY

Embodiments of the present invention provide a paging determining method, to effectively support reduction of terminal device power consumption.

According to a first aspect, a paging determining method is provided. A plurality of terminal devices are classified into M groups, M is an integer greater than 1, and the method includes:

determining, by a network device, a first group to which a first terminal device paged on a first paging occasion belongs, where the first group belongs to the M groups; and sending, by the network device, control information based on the first group, where the control information is used to indicate paging information, and the paging information includes a device identifier of the first terminal device.

Therefore, according to the paging determining method in this embodiment of the present invention, the plurality of terminal devices are classified into the M groups, and the network device determines, in the M groups, the first group to which the first terminal device paged on the first paging occasion belongs, and sends, based on the first group, the control information used to indicate the paging information including the device identifier of the first terminal device. In this way, a terminal device that wakes up on the first paging occasion can listen to or receive the control information based on a group to which the terminal device belongs, to determine, based on a listening result of the control information and the control information, whether the terminal device may be paged. Especially when a second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

In addition, when a quantity of paged terminal devices is relatively large and a capacity of a downlink data channel carrying paging information is relatively small, the network device can choose, based on the quantity of paged terminal devices and an amount of information that can be carried on the downlink data channel, to page terminal devices that are all distributed in a limited quantity of groups. In this way, after a terminal device that does not belong to the limited quantity of groups obtains the control information through listening or receives the control information, the terminal device can determine that the terminal device is not paged, and resume a sleep state, thereby effectively reducing power consumption.

With reference to the first aspect, in a first implementation of the first aspect, the M groups are obtained through classification based on device identifiers of the plurality of terminal devices; and the determining, by a network device, a first group to which a first terminal device paged on a first paging occasion belongs includes:

determining, by the network device, the first group based on the device identifier of the first terminal device.

Therefore, the network device can effectively reduce calculation complexity by classifying the terminal devices into the groups based on the device identifiers of the terminal devices, and the network device and the terminal devices follow a same grouping standard, so that no grouping information needs to be preconfigured, thereby reducing signaling overheads.

With reference to the first aspect, in a second implementation of the first aspect, the sending, by the network device, control information based on the first group includes:

determining, by the network device, first group identification information corresponding to the first group;

generating, by the network device, the control information based on the first group identification information; and sending, by the network device, the control information.

With reference to the first aspect, in a third implementation of the first aspect, the first group identification information is a first paging radio network temporary identifier P-RNTI; and the generating, by the network device, the control information based on the first group identification information includes:

generating, by the network device, the control information through scrambling by using the first P-RNTI.

With reference to the first aspect, in a fourth implementation of the first aspect, the sending, by the network device, control information based on the first group includes:

determining, by the network device, a first resource corresponding to the first group, where the first resource is any one of the following resources: a first time-frequency resource, a first time domain resource, a first frequency domain resource, or a first code domain resource; and sending, by the network device, the control information on the first resource.

With reference to the first aspect, in a fifth implementation of the first aspect, the control information includes a first field, the first field includes M bits, the M bits correspond to the M groups, and a value of a first bit corresponding to the first group in the M bits is used to indicate that at least one terminal device in the first group is paged.

With reference to the first aspect, in a sixth implementation of the first aspect, the control information includes a first field, the first field includes N bits, and the first field is used to indicate that at least one terminal device in the first group is paged.

With reference to the first aspect, in a seventh implementation of the first aspect, the control information is a first type of control information in two types of preset control information, and a second type of control information in the two types of control information is sent by the network device based on a paged terminal device.

According to a second aspect, a paging determining method is provided. A plurality of terminal devices are classified into M groups, M is an integer greater than 1, and the method includes:

determining, by a second terminal device, a second group to which the second terminal device belongs, where the second group belongs to the M groups;

listening to, by the second terminal device on a first paging occasion based on the second group, control information sent by a network device, where the control information is used to indicate paging information, the paging information includes a device identifier of at least one terminal device, the at least one terminal device is a terminal device paged on the first paging occasion, and the at least one terminal device belongs to any one of the M groups; and determining, by the second terminal device based on a listening result of the control information, whether the second terminal device is paged.

Therefore, according to the paging determining method in this embodiment of the present invention, the plurality of terminal devices are classified into the M groups, and the second terminal device listens to or receives the control information based on the group to which the second terminal device belongs, to determine, based on a listening result of the control information and the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

With reference to the second aspect, in a first implementation of the second aspect, the M groups are obtained through classification based on device identifiers of the plurality of terminal devices; and the determining, by a second terminal device, a second group to which the second terminal device belongs includes:

determining, by the second terminal device, the second group based on a device identifier of the second terminal device.

Therefore, calculation complexity can be effectively reduced by classifying the terminal devices into the groups based on the device identifiers of the terminal devices, and the network device and the terminal devices follow a same grouping standard, so that no grouping information needs to be preconfigured, thereby reducing signaling overheads.

With reference to the second aspect, in a second implementation of the second aspect, the listening to, by the second terminal device on a first paging occasion based on the second group, control information sent by a network device includes:

determining, by the second terminal device, second group identification information corresponding to the second group; and listening to, by the second terminal device on the first paging occasion based on the second group identification information, the control information sent by the network device; and the determining, by the second terminal device based on a listening result of the control information, whether the second terminal device is paged includes:

if the second terminal device obtains the control information through listening, receiving, by the second terminal device, the paging information based on the control information, and determining, based on the paging information, whether the second terminal device is paged; or if the second terminal device fails to obtain the control information through listening, determining, by the second terminal device, that the second terminal device is not paged.

With reference to the second aspect, in a third implementation of the second aspect, the second group identification information is a second paging radio network temporary identifier P-RNTI.

With reference to the second aspect, in a fourth implementation of the second aspect, the listening to, by the second terminal device on a first paging occasion based on the second group, control information sent by a network device includes:

determining, by the second terminal device, a second resource corresponding to the second group, where the second resource is any one of the following resources: a second time-frequency resource, a second time domain resource, a second frequency domain resource, or a second code domain resource; and listening to, by the second terminal device on the first paging occasion on the second resource, the control information sent by the network device; and the determining, by the second terminal device based on a listening result of the control information, whether the second terminal device is paged includes:

if the second terminal device obtains the control information through listening, receiving, by the second terminal device, the paging information based on the control information, and determining, based on the paging information, whether the second terminal device is paged; or if the second terminal device fails to obtain the control information through listening, determining, by the second terminal device, that the second terminal device is not paged.

With reference to the second aspect, in the fifth implementation of the second aspect, the control information is a first type of control information in two types of preset control information, and a second type of control information in the two types of control information is sent by the network device based on a paged terminal device.

According to a third aspect, a paging determining method is provided. A plurality of terminal devices are classified into M groups, M is an integer greater than 1, and the method includes:

determining, by a second terminal device, a second group to which the second terminal device belongs, where the second group belongs to the M groups;

receiving, by the second terminal device on a first paging occasion, control information sent by a network device, where the control information is used to indicate paging information, the paging information includes a device identifier of at least one terminal device, the at least one terminal device is a terminal device paged on the first paging occasion, and the at least one terminal device belongs to any one of the M groups, where the control information includes a first field, the first field includes M bits, the M bits correspond to the M groups, and a value of each bit is used to indicate that at least one terminal device in a corresponding group is paged, or a value of each bit is used to indicate that no terminal device in a corresponding group is paged; and determining, by the second terminal device based on a second bit in the first field, whether the second terminal device is paged, where the second bit belongs to the M bits.

Therefore, according to the method in this embodiment of the present invention, the first field including the M bits is added to the control information, the M bits correspond to the M groups, and each bit is used to indicate whether at least one terminal device in a corresponding group is paged. In this way, the second terminal device that wakes up on the first paging occasion can receive the control information, to determine in advance, based on the first field in the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

With reference to the third aspect, in a first implementation of the third aspect, the M groups are obtained through classification based on device identifiers of the plurality of terminal devices; and the determining, by a second terminal device, a second group to which the second terminal device belongs includes:

determining, by the second terminal device, the second group based on a device identifier of the second terminal device.

According to a fourth aspect, a paging determining method is provided. A plurality of terminal devices are classified into M groups, M is an integer greater than 1, and the method includes:

determining, by a second terminal device, a second group to which the second terminal device belongs, where the second group belongs to the M groups;

receiving, by the second terminal device on a first paging occasion, control information sent by a network device, where the control information is used to indicate paging information, the paging information includes a device identifier of at least one terminal device, the at least one terminal device is a terminal device paged on the first paging occasion, and a group to which the at least one terminal device belongs to any one of the M groups, where the control information includes a first field, the first field includes N bits, and the first field is used to indicate that at least one terminal device in the any group is paged; and if the first field indicates that at least one terminal device in the second group is paged, receiving, by the second terminal device, the paging information based on the control information, and determining, based on the paging information, whether the second terminal device is paged; or if the first field does not indicate that at least one terminal device in the second group is paged, determining, by the second terminal device, that the second terminal device is not paged.

Therefore, according to the method in this embodiment of the present invention, the first field including the N bits is added to the control information, and a bit sequence including the N bits is used to indicate that at least one terminal device in a group is paged. In this way, the second terminal device that wakes up on the first paging occasion can receive the control information, to determine in advance, based on the first field in the control information, whether the second terminal device may be paged. Especially when the group to which the second terminal device belongs is different from a group corresponding to the first field, the second terminal device can directly determine in advance, based on the first field, that the second terminal device is not paged, so that the second terminal device no longer needs to determine, based on the paging information indicated by the control information, whether the second terminal device is paged, thereby effectively reducing power consumption of the second terminal device.

With reference to the fourth aspect, in a first implementation of the fourth aspect, the M groups are obtained through classification based on device identifiers of the plurality of terminal devices; and the determining, by a second terminal device, a second group to which the second terminal device belongs includes:

determining, by the second terminal device, the second group based on a device identifier of the second terminal device.

According to a fifth aspect, a paging determining apparatus is provided. The apparatus can be configured to perform an operation of the network device in the first aspect and any possible implementation of the first aspect. Specifically, the apparatus may include a module or unit configured to perform the operation of the network device in the first aspect or any possible implementation of the first aspect.

According to a sixth aspect, a paging determining apparatus is provided. The apparatus can be configured to perform an operation of the terminal device in the second aspect and any possible implementation of the second aspect. Specifically, the apparatus may include a module or unit configured to perform the operation of the terminal device in the second aspect or any possible implementation of the second aspect.

According to a seventh aspect, a paging determining apparatus is provided. The apparatus can be configured to perform an operation of the terminal device in the third aspect and any possible implementation of the third aspect. Specifically, the apparatus may include a module or unit configured to perform the operation of the terminal device in the third aspect or any possible implementation of the third aspect.

According to an eighth aspect, a paging determining apparatus is provided. The apparatus can be configured to perform an operation of the terminal device in the fourth aspect and any possible implementation of the fourth aspect. Specifically, the apparatus may include a module or unit configured to perform the operation of the terminal device in the fourth aspect or any possible implementation of the fourth aspect.

According to a ninth aspect, a network device is provided. The network device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the network device performs the method in the first aspect or any possible implementation of the first aspect, or the network device implements the apparatus provided in the fifth aspect.

According to a tenth aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the terminal device performs the method in the second aspect or any possible implementation of the second aspect, or the terminal device implements the apparatus provided in the sixth aspect.

According to an eleventh aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the terminal device performs the method in the third aspect or any possible implementation of the third aspect, or the terminal device implements the apparatus provided in the seventh aspect.

According to a twelfth aspect, a terminal device is provided. The terminal device includes a processor, a transceiver, and a memory. The processor, the transceiver, and the memory communicate with each other by using an internal connection path. The memory is configured to store an instruction. The processor is configured to execute the instruction stored in the memory. When the processor executes the instruction stored in the memory, the terminal device performs the method in the fourth aspect or any possible implementation of the fourth aspect, or the terminal device implements the apparatus provided in the eighth aspect.

According to a thirteenth aspect, a computer-readable storage medium is provided, configured to store a computer program. The computer program includes an instruction used to perform the method in the first aspect and any possible implementation of the first aspect.

According to a fourteenth aspect, a computer-readable storage medium is provided, configured to store a computer program. The computer program includes an instruction used to perform the method in the second aspect and any possible implementation of the second aspect.

According to a fifteenth aspect, a computer-readable storage medium is provided, configured to store a computer program. The computer program includes an instruction used to perform the method in the third aspect and any possible implementation of the third aspect.

According to a sixteenth aspect, a computer-readable storage medium is provided, configured to store a computer program. The computer program includes an instruction used to perform the method in the fourth aspect and any possible implementation of the fourth aspect.

In some of the foregoing implementations, before the sending, by the network device, control information based on the first group, the method further includes:

sending, by the network device, first indication information, where the first indication information is used to indicate a correspondence between the M groups and N pieces of group identification information, the first group identification information is group identification information corresponding to the first group in the N pieces of group identification information, and N is an integer greater than or equal to M.

In some of the foregoing implementations, before the sending, by the network device, control information based on the first group, the method further includes:

sending, by the network device, second indication information, where the second indication information is used to indicate a correspondence between the M groups and P resources, the first resource is a resource corresponding to the first group in the P resources, and P is an integer greater than or equal to M.

DESCRIPTION OF EMBODIMENTS

Figure 1:
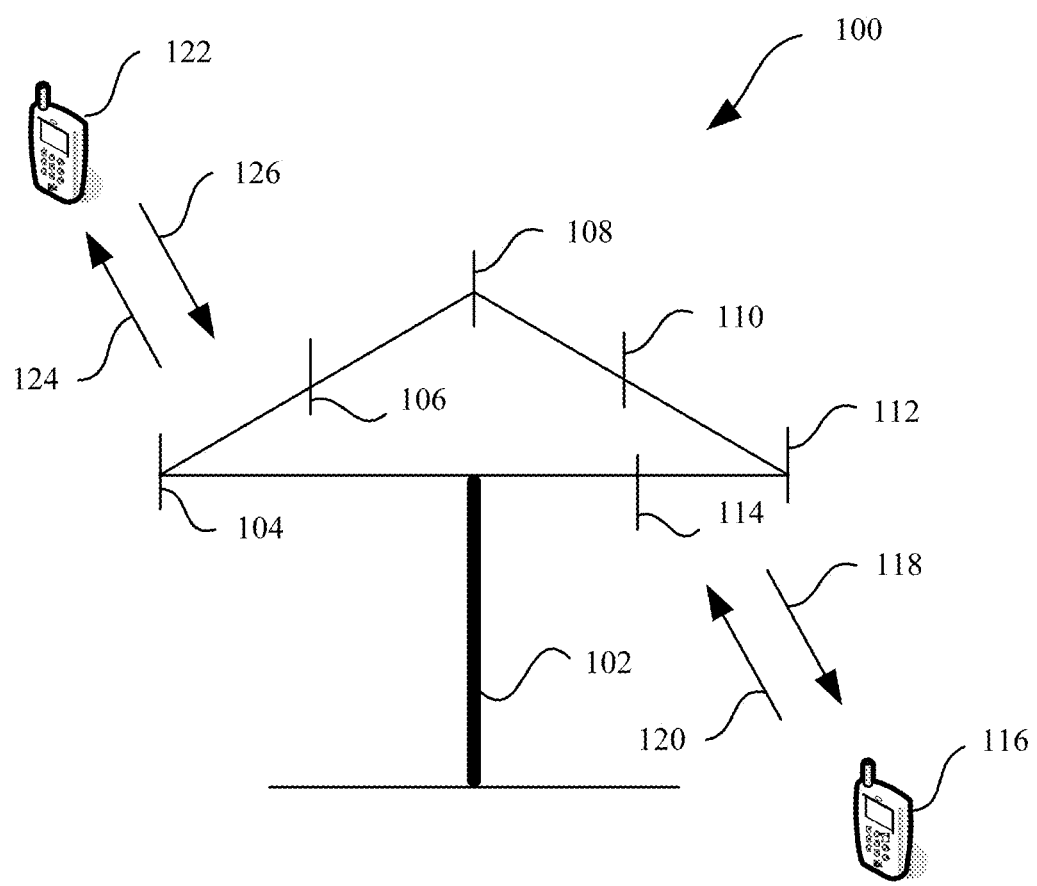
FIG. 1 is a schematic diagram of a communications system for data transmission that is applied to an embodiment of the present invention.

The following clearly describes the technical solutions in the embodiments of the present invention with reference to the accompanying drawings in the embodiments of the present invention.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be understood that, the embodiments of the present invention may be applied to various communications systems, for example, systems such as a Global System for Mobile Communications (Global System for Mobile Communications, GSM), a Wideband Code Division Multiple Access (Wideband Code Division Multiple Access, WCDMA) system, and an LTE system, and supported communication is mainly voice and data communication. Usually, a conventional base station supports a limited quantity of connections, and is easy to implement.

A next-generation mobile communications system makes future mobile data traffic growth, a massive Internet of Things, and diversified new services and application scenarios possible. In addition to acting as a unified connection framework, basic 5G New Radio (5th Generation New Radio, 5G NR) of a new generation cellular network is expected to increase a data speed, a capacity, a delay, reliability, efficiency, and a coverage capability that are of a network to a new level, and fully use each bit of available spectrum resource. Moreover, 5G based on an orthogonal frequency division multiplexing (Orthogonal Frequency Division Multiplexing, OFDM) New Radio design becomes a global standard, not only supports a 5G device and diversified deployment and covers diversified spectrums (including covering low and high bands), but also needs to support diversified services and terminals.

The embodiments are described with reference to a terminal device in the embodiments of the present invention. The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STATION, STA) in a wireless local area network (Wireless Local Area Network, WLAN), or may be a cellular phone, a cordless telephone set, a Session Initiation Protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or another processing device connected to a wireless modem, an in-vehicle device, a wearable device, a terminal device in a future 5G network, a terminal device in a future evolved PLMN network, or the like.

In addition, the embodiments are described with reference to a network device in the embodiments of the present invention. The network device may be a device used for communicating with a mobile device, for example, a network device. The network device may be an access point (ACCESS POINT, AP) in a WLAN or a base transceiver station (Base Transceiver Station, BTS) in GSM or Code Division Multiple Access (Code Division Multiple Access, CDMA), or may be a NodeB (NodeB, NB) in WCDMA, or may be an evolved NodeB (Evolved NodeB, eNB or eNodeB) in LTE, a relay node or an access point, an in-vehicle device, a wearable device, a network device in a future 5G network, a network device in a future evolved PLMN network, or the like.

A method and an apparatus that are provided in the embodiments of the present invention may be applied to a terminal device or a network device. The terminal device or the network device includes a hardware layer, an operating system layer running above the hardware layer, and an application layer running above the operating system layer. The hardware layer includes hardware such as a central processing unit (Central Processing Unit, CPU), a memory management unit (Memory Management Unit, MMU), and a memory (also referred to as a main memory). The operating system may be any one or more of computer operating systems that implement service processing by using a process (Process), for example, a Linux operating system, a Unix operating system, an Android operating system, an iOS operating system, or a Windows operating system. The application layer includes applications such as a browser, an address book, word processing software, and instant messaging software. Moreover, in the embodiments of the present invention, a specific structure of an entity for performing a control information transmission method is not particularly limited in the embodiments of the present invention, provided that the entity can run a program including code of the control information transmission method in the embodiments of the present invention, to perform communication according to the control information transmission method in the embodiments of the present invention. For example, an entity for performing a wireless communication method in the embodiments of the present invention may be a terminal device or a network device, or a function module that is in a terminal device or a network device and that can invoke a program and execute the program.

In addition, aspects or features of the embodiments of the present invention may be implemented as a method, an apparatus, or a product that uses standard programming and/or engineering technologies. The term "product" used in the embodiments of the present invention covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (Compact Disc, CD) and a digital versatile disc (Digital Versatile Disc, DVD)), a smart card, and a flash memory device (for example, an erasable programmable read-only memory (Erasable Programmable Read-Only Memory, EPROM), a card, a stick, or a key drive). In addition, various storage media described in this specification may indicate one or more devices and/or other machine-readable media used to store information. The term "machine-readable media" may include but are not limited to a radio channel, and various other media that can store, contain, and/or carry an instruction and/or data.

FIG. 1 is a schematic diagram of a communications system for data transmission that is applied to an embodiment of the present invention. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (Frequency Division Duplex, FDD) system, the forward link 118 may use a band different from that used by the reverse link 120, and the forward link 124 may use a band different from that used by the reverse link 126.

For another example, in a time division duplex (Time Division Duplex, TDD) system and a full duplex (Full Duplex) system, the forward link 118 and the reverse link 120 may use a same band, and the forward link 124 and the reverse link 126 may use a same band.

Each antenna (or antenna group including a plurality of antennas) and/or area designed for communication is referred to as a sector of the network device 102. For example, an antenna group may be designed to communicate with a terminal device in a sector of a coverage area of the network device 102. When the network device 102 respectively communicates with the terminal devices 116 and 122 by using the forward links 118 and 124, transmit antennas of the network device 102 may improve signal-to-noise ratios of the forward links 118 and 124 through beamforming. In addition, compared with a manner in which a network device sends signals to all terminal devices of the network device by using a single antenna, a manner in which the network device 102 sends, through beamforming, signals to the terminal devices 116 and 122 that are randomly scattered in a related coverage area causes less interference to a mobile device in a neighboring cell.

Within a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain (for example, generate, receive from another communications apparatus, or store in a memory) a specific quantity of data bits that need to be sent to the wireless communications receiving apparatus by using a channel. The data bits may be included in a transport block (or a plurality of transport blocks) of data, and the transport block may be segmented to generate a plurality of code blocks.

In addition, the communications system 100 may be a public land mobile network (Public Land Mobile Network, PLMN), a D2D network, an M2M network, or another network. FIG. 1 is only an example of a simplified schematic diagram. The network may further include another network device not shown in FIG. 1.

In an existing LTE system, paging information is carried on a downlink data channel. On a paging occasion, after determining a terminal device that needs to be paged on the paging occasion, a network device indicates, by using downlink control information (Downlink Control Information, DCI), the downlink data channel carrying the paging information. The paging information includes a device identifier (for example, a user equipment identifier (User Equipment Identifier, UE ID)) of the paged terminal device. Based on a system configuration, a terminal device wakes up on a paging occasion (namely, the paging occasion) of the terminal device to listen to the DCI. If the terminal device obtains the DCI through listening, the terminal device receives the downlink data channel based on the DCI, to obtain the paging information. If the paging information includes a device identifier of the terminal device, it indicates that the network device pages the terminal device, and the terminal device subsequently accesses a network. If the paging information does not include the device identifier of the terminal device, it indicates that the network device is not paging the terminal device, and the terminal device subsequently enters a sleep state.

In a future 5G system, paging information is sent together with a synchronization channel. Therefore, a quantity of paging occasions in the 5G system is much less than a quantity of paging occasions in the LTE system. Because the quantity of paging occasions is reduced, more terminal devices need to be paged on one paging occasion. For example, in the LTE system, 32 subframes include four paging occasions, and about 16 terminal devices are paged on each paging occasion, while in the 5G system, 32 subframes may include only one paging occasion, and a quantity of terminal devices that need to be paged on one paging occasion is greater than 15 or more.

However, paging information carried on a downlink data channel carries a limited quantity of device identifiers of terminal devices. Based on a system setting, a plurality of terminal devices wake up on one paging occasion to listen to DCI that is sent by a network device and that indicates a downlink data channel carrying paging information. After obtaining the DCI through listening, the plurality of terminal devices demodulate and decode the data channel regardless of whether the plurality of terminal devices are paged, to receive the paging information so as to determine whether the plurality of terminal devices are paged. Because the paging information includes a limited quantity of device identifiers of paged terminal devices, only some terminal devices can determine, from the paging information, that the terminal devices are paged, while the other terminal devices determine, from a paging information, that the terminal devices are not paged.

For the other terminal devices that are not paged, the terminal devices that wake up on the current paging occasion in the 5G system waste more power of the terminal devices than in the LTE system, because there are a larger quantity of paging occasions in the LTE system, terminal devices that need to be paged may be distributed and paged on a plurality of paging occasions, and terminal devices that wake up on corresponding paging occasions to listen to DCI are more likely to determine that the terminal devices are paged, so that power consumption of the terminal devices is reduced.

Therefore, the embodiments of the present invention provide a paging determining method, to effectively support reduction of terminal device power consumption.

The embodiments of the present invention not only can be applied to the future 5G system, but also can be applied to the existing LTE system, and the embodiments of the present invention are not limited thereto.

In the technical solutions in the embodiments of the present invention, a plurality of terminal devices are classified into M groups, M is an integer greater than 1, a plurality of paging cycles are configured in time domain, at least one paging occasion is configured in each paging cycle, and a first paging occasion of the at least one paging occasion is used to page the plurality of terminal devices.

Specifically, the first paging occasion is any one of the plurality of paging occasions, and on the first paging occasion, the plurality of terminal devices all wake up from a sleep state to listen to DCI, to determine whether the plurality of terminal devices are paged. In other words, the first paging occasion is used to page the plurality of terminal devices.

Each paging occasion is related to a device identifier (for example, a UE ID) in the prior art. In other words, a paging occasion on which a terminal device needs to wake up to listen to paging-related control information is related to a device identifier of the terminal device. For example, paging occasions on which different terminal devices need to wake up to listen to paging-related control information may be calculated by using a related algorithm.

For ease of description, in the embodiments of the present invention, the embodiments of the present invention are described in detail by using a first paging cycle of a plurality of paging cycles and a first paging occasion in the first paging cycle as an example.

It should be noted that, in the embodiments of the present invention, the plurality of terminal devices correspond to the first paging occasion. In other words, the plurality of terminal devices all need to wake up on the first paging occasion to listen to control information to determine whether the plurality of terminal devices are paged.

In the embodiments of the present invention, the M groups may be obtained through classification by a device (for example, a network device or a terminal device) in a communications system based on inherent attributes of the terminal devices or a network preconfiguration.

For example, the at least one terminal device is classified into the M groups based on device identifiers (for example, UE IDs) of the terminal devices. More specifically, a modulo operation is performed on the UE IDs of the terminal devices, where (UE ID) mod M=m, M is a quantity of the groups, and m is a remainder of (UE ID) modulo M, and may also be understood as a number corresponding to a group. For example, m is equal to 1, and represents a first group; m is equal to 2, and represents a second group.

For another example, the at least one terminal device may be classified into the M groups based on supported service types. More specifically, for example, a terminal device supporting a service #1 is classified into a group #1, and a terminal device supporting a service #2 is classified into a group #2.

For another example, a network side may preconfigure a terminal device group list, and preconfigure the terminal device group list for the terminal devices.

Figure 2:
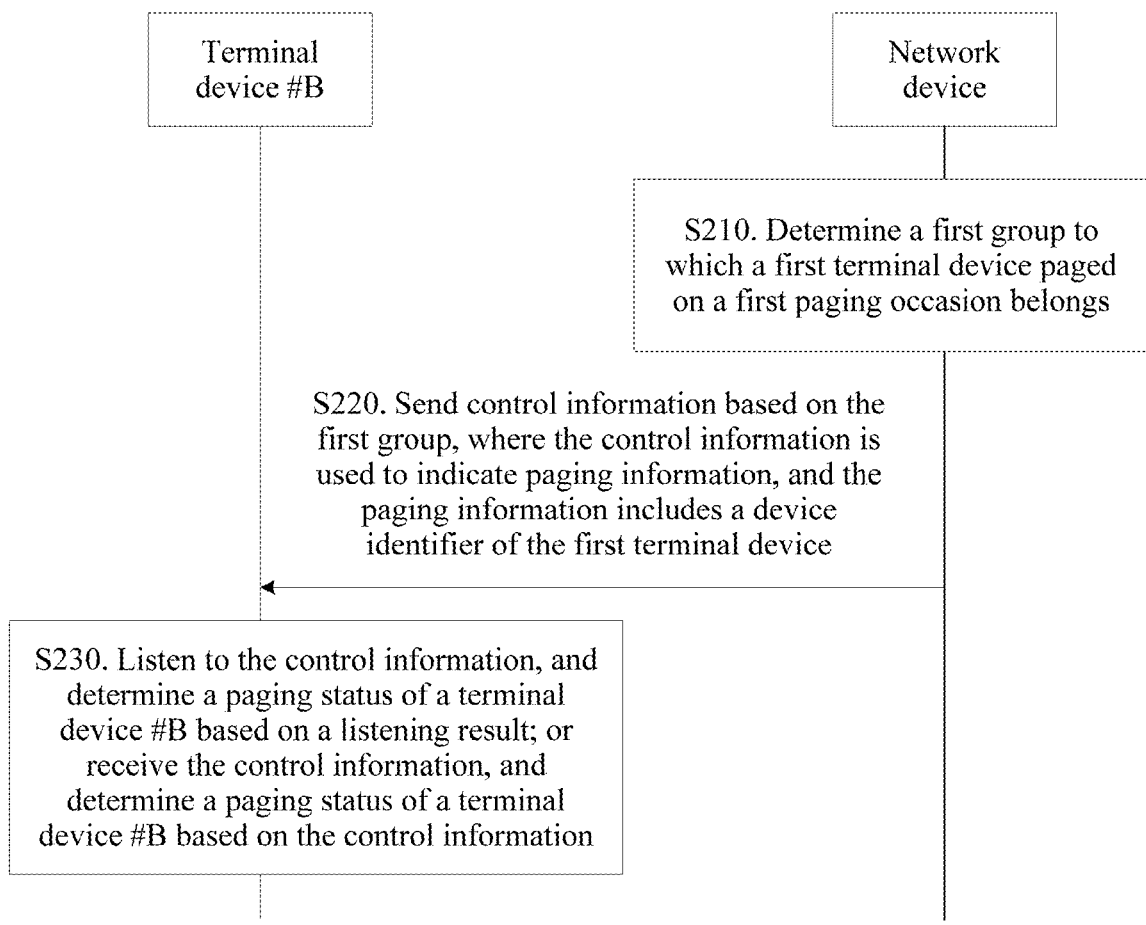
FIG. 2 is a schematic flowchart of a paging determining method according to an embodiment of the present invention.

FIG. 2 is a schematic flowchart of a paging determining method according to an embodiment of the present invention. The method 200 includes the following steps. S210. A network device determines a first group to which a first terminal device paged on a first paging occasion belongs, where the first group belongs to M groups.

In other words, after determining that a terminal device #A (an example of the first terminal device) needs to be paged, the network device determines a group, namely, a group #A, to which the terminal device #A belongs in the M groups.

Specifically, as described above, the M groups may be obtained through classification by a device (for example, a network device or a terminal device) in a communications system based on inherent attributes of terminal devices. More specifically, the M groups are obtained through classification based on device identifiers of the plurality of terminal devices.

In this way, calculation complexity can be effectively reduced by classifying the terminal devices into the groups based on the device identifiers of the terminal devices, and the network device and the terminal devices follow a same grouping standard, so that no grouping information needs to be preconfigured, thereby reducing signaling overheads.

Optionally, the determining, by a network device, a first group to which a first terminal device paged on a first paging occasion belongs includes:

determining, by the network device, the first group based on a device identifier of the first terminal device.

In other words, the network device may determine, based on a device identifier (for example, a UE ID) of the terminal device #A, the group #A to which the terminal device #A belongs.

S220. The network device sends control information based on the first group, where the control information is used to indicate paging information, and the paging information includes a device identifier of the first terminal device.

The control information may be DCI, and the control information is used to indicate the paging information. Specifically, the control information may indicate whether at least one terminal device in the group #A is paged, and the control information is further used to indicate a downlink data channel (in other words, a time-frequency resource for the paging information) carrying the paging information.

It should be noted that, in this embodiment of the present invention, if the network device determines that a plurality of terminal devices (including the terminal device #A) needing to be paged belong to the group #A, the paging information not only includes the device identifier of the terminal device #A, but also includes a device identifier of a terminal device in the plurality of terminal devices needing to be paged other than the terminal device #A. This embodiment of the present invention is not limited thereto.

S230. A second terminal device in a plurality of terminal devices listens to the control information on the first paging occasion, and determines, based on a listening result, whether the second terminal device is paged; or the second terminal device receives the control information, and determines, based on the control information, whether the second terminal device is paged.

The second terminal device is any one of a plurality of terminal devices needing to wake up on the first paging occasion to listen to the control information. A process step in which the second terminal device #B specifically determines whether the second terminal device is paged is subsequently described in detail, and is not described herein.

Therefore, according to the paging determining method in this embodiment of the present invention, the plurality of terminal devices are classified into the M groups, and the network device determines, in the M groups, the first group to which the first terminal device paged on the first paging occasion belongs, and sends, based on the first group, the control information used to indicate the paging information including the device identifier of the first terminal device. In this way, a terminal device that wakes up on the first paging occasion can listen to or receive the control information based on a group to which the terminal device belongs, to determine, based on a listening result of the control information and the control information, whether the terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

In addition, when a quantity of paged terminal devices is relatively large and a capacity of a downlink data channel carrying paging information is relatively small, the network device can choose, based on the quantity of paged terminal devices and an amount of information that can be carried on the downlink data channel, to page terminal devices that are all distributed in a limited quantity of groups. In this way, after a terminal device that does not belong to the limited quantity of groups obtains the control information through listening or receives the control information, the terminal device can determine that the terminal device is not paged, and resume a sleep state, thereby effectively reducing power consumption.

In this embodiment of the present invention, after determining the group #A to which the terminal device #A belongs, the network device sends the control information based on the group #A. A specific sending manner of the network device includes four cases. The four cases are described below in detail by using the following embodiments.

Case 1

Figure 3:
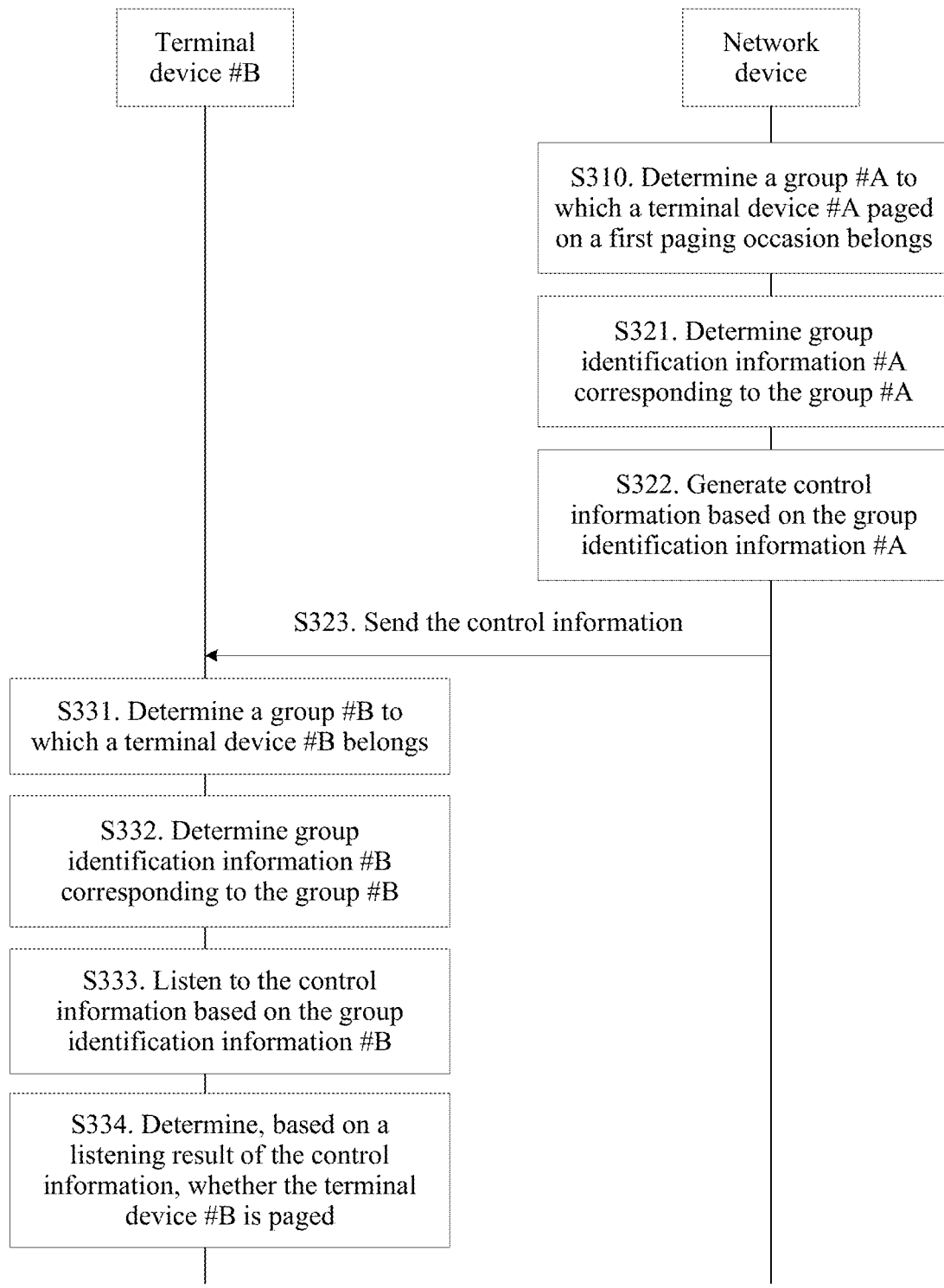
FIG. 3 is a schematic flowchart of a paging determining method according to another embodiment of the present invention.

FIG. 3 is a schematic flowchart of a paging determining method according to another embodiment of the present invention. As shown in FIG. 3:

The sending, by the network device, control information based on the first group includes the following steps:

S321. The network device determines first group identification information corresponding to the first group, where the first group identification information is used to identify the first group.

S322. The network device generates the control information based on the first group identification information.

S323. The network device sends the control information.

Specifically, N pieces of group identification information are preconfigured or configured in the communications system, the N pieces of group identification information correspond to the M groups, and N is an integer greater than or equal to M. In other words, each of the M groups corresponds to at least one of the N pieces of group identification information, and any two groups correspond to different group identification information.

In this way, after the network device determining the group #A to which the terminal device #A belongs, in 321, the network device may determine, in the N pieces of group identification information, group identification information #A (an example of the first group identification information) corresponding to the group #A. The group identification information #A is any one of at least one piece of group identification information corresponding to the group #A.

Then in S322, the network device generates the control information based on the group identification information #A, and in S323, the network device sends the control information.

That a terminal device #B (an example of the second terminal device) listens to the control information is specifically as follows:

S331. The second terminal device determines a second group to which the second terminal device belongs, where the second group belongs to the M groups.

S332. The second terminal device determines second group identification information corresponding to the second group, where the second group identification information is used to identify the second group.

S333. The second terminal device listens to, on the first paging occasion based on the second group identification information, the control information sent by the network device.

S334. The second terminal device determines, based on a listening result of the control information, whether the second terminal device is paged.

Specifically, the terminal device #B needs to wake up on the first paging occasion to listen to paging-related control information. In S331, the terminal device #B first determines a group, namely, a group #B (an example of the second group), to which the terminal device #B belongs in the M groups. In S332, the terminal device #B determines, in the N pieces of group identification information preconfigured or configured in the system, group identification information #B (an example of the second group identification information) corresponding to the group #B. In S333, the terminal device #B listens to the control information based on the group identification information #B. In other words, the terminal device #B detects the control information by using the group identification information #B. Then in S334, the network device determines, based on a listening result of the control information, whether the terminal device #B is paged.

Specifically, the determining, by the second terminal device based on a listening result of the control information, whether the second terminal device is paged includes:

if the second terminal device obtains the control information through listening, receiving, by the second terminal device, the paging information based on the control information, and determining, based on the paging information, whether the second terminal device is paged; or if the second terminal device fails to obtain the control information through listening, determining, by the second terminal device, that the second terminal device is not paged.

In other words, when the terminal device #B detects the control information by using the group identification information #B, there are two listening results:

Result 1

The terminal device #B successfully obtains the control information through listening.

In this case, it indicates that the group identification information #B is the same as the group identification information #A, and the terminal device #B receives the control information.

Then the terminal device #B receives the paging information based on the control information. Specifically, the terminal device #B receives the paging information on the downlink data channel indicated by the control information, and performs processing such as demodulation and decoding on the paging information, to obtain the paging information.

After obtaining the paging information, the terminal device #B determines, based on a device identifier included in the paging information, whether the terminal device #B is paged. If the paging information includes a device identifier of the terminal device #B, the terminal device #B determines that the terminal device #B is paged. If the paging information does not include the device identifier of the terminal device #B, the terminal device #B determines that the terminal device #B is not paged.

In this embodiment of the present invention, the paging information includes the device identifier of the terminal device #A. If the paging information includes only the device identifier of the terminal device #A, a reverse description to the foregoing description is as follows: If the terminal device #B determines that the terminal device #B is paged, it indicates that the terminal device #B and the terminal device #A are a same terminal device. If the terminal device #B determines that the terminal device #B is not paged, it indicates that the terminal device #B and the terminal device #A are different terminal devices.

As described above, if the network device determines that a plurality of terminal devices (including the terminal device #A) needing to be paged belong to the group #A, the control information not only includes the device identifier of the terminal device #A, but also includes a device identifier of a terminal device in the plurality of terminal devices needing to be paged other than the terminal device #A. In other words, the paging information includes device identifiers of a plurality of terminal devices provided that the plurality of terminal devices need to be paged on the first paging occasion and belong to the group #A. For example, if the paging information not only includes the device identifier of the terminal device #A, but also includes the device identifier of the terminal device #B, after obtaining the paging information, the terminal device #B determines that the paging information includes the device identifier of the terminal device #B, and also determines that the terminal device #B is paged.

Result 2

The terminal device #B fails to obtain the control information through listening.

In this case, it indicates that the group identification information #B is different from the group identification information #A, the terminal device fails to obtain the control information through listening, and the terminal device #B determines that the terminal device #B is not paged, and resumes the sleep state.

In the prior art, even though the terminal device #B is not paged, after receiving the control information, the terminal device #B still receives the paging information, and then determines, based on the paging information, whether the terminal device #B is paged (actually, the terminal device #B is not paged), resulting in power waste. In this embodiment of the present invention, if the terminal device #B fails to obtain the control information through listening, the terminal device #B can directly determine that the terminal device #B is not paged, and no longer need to receive the paging information and perform a subsequent step. This effectively reduces power consumption compared with the prior art.

In this embodiment of the present invention, if each of a plurality of groups includes at least one terminal device needing to be paged, the network device sends control information corresponding to each group. Each piece of control information is generated by using corresponding group identification information, the control information includes paging information of a corresponding group, and each piece of paging information includes a device identifier of a paged terminal device. Any terminal device that wakes up on the first paging occasion listens to the control information sent by the network device, and also determines, based on a listening result, whether the terminal device is paged.

For example, five terminal devices need to wake up on the first paging occasion to listen to control information, and the network device determines that three terminal devices need to be paged. The three terminal devices are denoted as a terminal device #1, a terminal device #2, and a terminal device #3, the terminal device #1 belongs to a group #1, and the terminal device #2 and the terminal device #3 belong to a group #2. The network device sends control information (denoted as control information #1 for ease of distinguishing and understanding) based on group identification information #1 corresponding to the group #1. The control information #1 indicates paging information (denoted as paging information #1 for ease of distinguishing and understanding) corresponding to the group #1, and the paging information #1 includes a device identifier of the terminal device #1. The network device sends control information (denoted as control information #2 for ease of distinguishing and understanding) based on group identification information #2 corresponding to the group #2. The control information #2 indicates paging information (denoted as paging information #2 for ease of distinguishing and understanding) corresponding to the group #2, and the paging information #2 includes a device identifier of the terminal device #2 and a device identifier of the terminal device #3.

The terminal device #B is still used as an example. The terminal device #B listens to, based on the group identification information #B, the control information #1 and the control information #2 that are sent by the network device. If either of the two pieces of control information is successfully obtained through listening, assuming that the control information #1 is successfully obtained through listening (indicating that the group identification information #B is the same as the group identification information #1), the terminal device #B receives the paging information #1 based on the control information #1, and determines, based on the paging information, whether the terminal device #B is paged. If neither of the two pieces of control information is successfully obtained through listening, it indicates that the terminal device #B is not paged, and the terminal device #B resumes the sleep state.

It should be understood that, only when determining that a terminal device needs to be paged, the network device sends control information generated by using group identification information. If determining that no terminal device needs to be paged, the network device does not send control information generated by using group identification information.

Optionally, the first group identification information is a first paging radio network temporary identifier (Paging Radio Network Temporary Identifier, P-RNTI).

The generating, by the network device, the control information based on the first group identification information includes:

generating, by the network device, the control information through scrambling by using the first P-RNTI.

Specifically, in this embodiment of the present invention, group identification information may be a P-RNTI, the N pieces of group identification information correspond to N P-RNTIs, and each group corresponds to at least one P-RNTI. The group identification information #A corresponds to the first P-RNTI (denoted as a P-RNTI #A for ease of distinguishing and understanding).

In this way, the network device scrambles original information (namely, information that is not scrambled) of the control information by using the P-RNTI #A, to send the control information.

Correspondingly, for the terminal device #B, the group identification information #B may be a second P-RNTI (denoted as a P-RNTI #B for ease of distinguishing and understanding) of the N P-RNTIs. The terminal device #B decodes the control information by using the P-RNTI #B (namely, listens to the control information by using the P-RNTI #B), to determine whether the terminal device #B is paged.

For example but not for limitation, the group identification information may be different P-RNTIs, or may be a scrambling sequence, a bit sequence, or the like used to distinguish between different control information. This is not limited in this embodiment of the present invention.

Optionally, before the sending, by the network device, control information based on the first group, the method further includes:

sending, by the network device, first indication information, where the first indication information is used to indicate a correspondence between the M groups and the N pieces of group identification information, and N is an integer greater than or equal to M.

In other words, the network device sends a configured correspondence between the M groups and the N pieces of group identification information to terminal devices by using related signaling. The first indication information may be higher layer signaling, or may be static signaling or semi-static signaling. This is not limited herein.

Therefore, according to the paging determining method in this embodiment of the present invention, the network device determines, in the M groups, the first group to which the first terminal device paged on the first paging occasion belongs, and sends, based on the first group identification information corresponding to the first group, the control information used to indicate the paging information including the device identifier of the first terminal device. In this way, the second terminal device that wakes up on the first paging occasion can listen to the control information based on the second group identification information corresponding to the second group to which the second terminal device belongs, to determine in advance, based on a listening result of the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

Case 2

Figure 4:
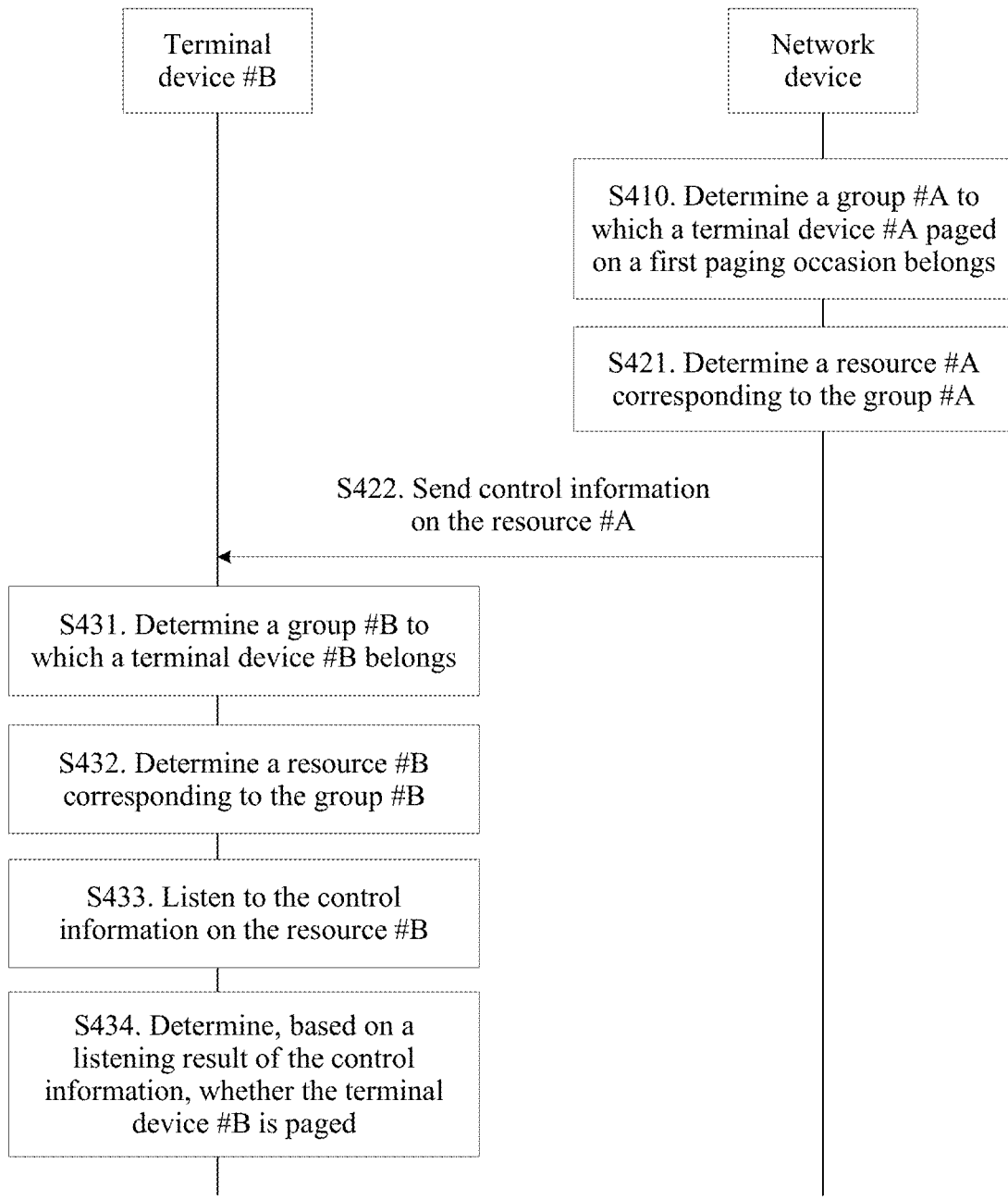
FIG. 4 is a schematic flowchart of a paging determining method according to another embodiment of the present invention.

FIG. 4 is a schematic flowchart of a paging determining method according to another embodiment of the present invention. As shown in FIG. 4:

The sending, by the network device, control information based on the first group includes the following steps:

S421. The network device determines a first resource corresponding to the first group, where the first resource is any one of the following resources: a first time-frequency resource, a first time domain resource, a first frequency domain resource, or a first code domain resource.

S422. The network device sends the control information on the first resource.

Specifically, N resources are preconfigured or configured in the communications system, each of the N resources may be any one of a frequency domain resource, a time domain resource, a time-frequency resource, and a code domain resource, the N resources correspond to the M groups, and N is an integer greater than or equal to M. In other words, each of the M groups corresponds to at least one of the N resources, and any two groups correspond to different resources.

In this way, after the network device determines the group #A to which the terminal device #A belongs, in S421, the network device may determine, in the N resources, a resource #A (an example of the first resource) corresponding to the group #A. The resource #A is any one of at least one resource corresponding to the group #A.

Then in S422, the network device sends the control information on the determined resource #A.

That a terminal device #B listens to the control information is specifically as follows:

S431. The second terminal device determines a second group to which the second terminal device belongs, where the second group belongs to the M groups.

S432. The second terminal device determines a second resource corresponding to the second group, where the second resource is any one of the following resources: a second time-frequency resource, a second time domain resource, a second frequency domain resource, or a second code domain resource.

S433. The second terminal device listens to, on the first paging occasion on the second resource, the control information sent by the network device.

S434. The second terminal device determines, based on a listening result of the control information, whether the second terminal device is paged.

Specifically, the terminal device #B needs to wake up on the first paging occasion to listen to paging-related control information. In S431, the terminal device #B first determines a group, namely, a group #B (an example of the second group), to which the terminal device #B belongs in the M groups. In S432, the terminal device #B determines, in the N resources preconfigured or configured in the system, a resource #B (an example of the second resource) corresponding to the group #B. In S433, the terminal device #B listens to the control information on the determined resource #B. The terminal device #B attempts to receive the control information on the resource #B. Then in S434, the terminal device #B determines, based on a listening result of the control information, whether the terminal device #B is paged.

Specifically, the determining, by the second terminal device based on a listening result of the control information, whether the second terminal device is paged includes:

if the second terminal device obtains the control information through listening, receiving, by the second terminal device, the paging information based on the control information, and determining, based on the paging information, whether the second terminal device is paged; or if the second terminal device fails to obtain the control information through listening, determining, by the second terminal device, that the second terminal device is not paged.

In other words, when the terminal device #B listens to the control information by using the resource #B, there are two listening results:

Result 1

The terminal device #B successfully obtains the control information through listening.

In this case, it indicates that the resource #B and the resource #A are a same resource, and the terminal device #B receives the control information.

Then the terminal device #B receives the paging information based on the control information. Specifically, the terminal device #B receives the paging information on the downlink data channel indicated by the control information, and performs processing such as demodulation and decoding on the paging information, to obtain the paging information.

After obtaining the paging information, the terminal device #B determines, based on a device identifier included in the paging information, whether the terminal device #B is paged. If the paging information includes a device identifier of the terminal device #B, the terminal device #B determines that the terminal device #B is paged. If the paging information does not include the device identifier of the terminal device #B, the terminal device #B determines that the terminal device #B is not paged.

In this embodiment of the present invention, the paging information includes the device identifier of the terminal device #A. If the paging information includes only the device identifier of the terminal device #A, a reverse description to the foregoing description is as follows: If the terminal device #B determines that the terminal device #B is paged, it indicates that the terminal device #B and the terminal device #A are a same terminal device. If the terminal device #B determines that the terminal device #B is not paged, it indicates that the terminal device #B and the terminal device #A are different terminal devices.

As described above, if the network device determines that a plurality of terminal devices (including the terminal device #A) needing to be paged belong to the group #A, the control information not only includes the device identifier of the terminal device #A, but also includes a device identifier of a terminal device in the plurality of terminal devices needing to be paged other than the terminal device #A. In other words, the paging information includes device identifiers of a plurality of terminal devices provided that the plurality of terminal devices need to be paged on the first paging occasion and belong to the group #A. For example, if the paging information not only includes the device identifier of the terminal device #A, but also includes the device identifier of the terminal device #B, after obtaining the paging information, the terminal device #B determines that the paging information includes the device identifier of the terminal device #B, and also determines that the terminal device #B is paged.

Result 2

The terminal device #B fails to obtain the control information through listening.

In this case, it indicates that the resource #B is different from the resource #A, the terminal device fails to obtain the control information through listening, and the terminal device #B determines that the terminal device #B is not paged, and resumes the sleep state.

In this embodiment of the present invention, if each of a plurality of groups includes at least one terminal device needing to be paged, the network device sends control information corresponding to each group. Each piece of control information is sent by using a corresponding resource, the control information includes paging information of a corresponding group, and each piece of paging information includes a device identifier of a paged terminal device. Any terminal device that wakes up on the first paging occasion listens to the control information sent by the network device, and also determines, based on a listening result, whether the terminal device is paged.

Similarly, a description is provided by using an example in which five terminal devices need to wake up on the first paging occasion to listen to control information. For example, the five terminal devices need to wake up on the first paging occasion to listen to the control information, and the network device determines that three terminal devices need to be paged. The three terminal devices are denoted as a terminal device #1, a terminal device #2, and a terminal device #3, the terminal device #1 belongs to a group #1, and the terminal device #2 and the terminal device #3 belong to a group #2. The network device sends control information (denoted as control information #1 for ease of distinguishing and understanding) on a resource #1 corresponding to the group #1. The control information #1 indicates paging information (denoted as paging information #1 for ease of distinguishing and understanding) corresponding to the group #1, and the paging information #1 includes a device identifier of the terminal device #1. The network device sends control information (denoted as control information #2 for ease of distinguishing and understanding) on a resource #2 corresponding to the group #2. The control information #2 indicates paging information (denoted as paging information #2 for ease of distinguishing and understanding) corresponding to the group #2, and the paging information #2 includes a device identifier of the terminal device #2 and a device identifier of the terminal device #3.

The terminal device #B is still used as an example. The terminal device #B listens to, on the resource #B determined by the terminal device #B, the control information sent by the network device. If either of the control information #1 and the control information #2 is successfully obtained through listening, assuming that the control information #1 is successfully obtained through listening (indicating that the resource #B is the same as the resource #1), the terminal device #B receives the paging information #1 based on the control information #1, and determines, based on the paging information, whether the terminal device #B is paged. If neither of the two pieces of control information is successfully obtained through listening, it indicates that the terminal device #B is not paged, and the terminal device #B resumes the sleep state.

Optionally, before the sending, by the network device, control information based on the first group, the method further includes:

sending, by the network device, second indication information, where the second indication information is used to indicate a correspondence between the M groups and P resources, the P resources are any one of the following resources: a time-frequency resource, a time domain resource, a frequency domain resource, or a code domain resource, and P is an integer greater than or equal to M.

In other words, the network device sends a configured correspondence between the M groups and the P resources to terminal devices by using related signaling. The second indication information may be higher layer signaling, or may be static signaling or semi-static signaling. This is not limited herein.

Therefore, according to the paging determining method in this embodiment of the present invention, the network device determines, in the M groups, the first group to which the first terminal device paged on the first paging occasion belongs, and sends, on the first resource corresponding to the first group, the control information used to indicate the paging information including the device identifier of the first terminal device. In this way, the second terminal device that wakes up on the first paging occasion can listen to, on the second resource corresponding to the second group to which the second terminal device belongs, the control information sent by the network device, to determine in advance, based on a listening result of the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

Case 3

Figures 5, 6:
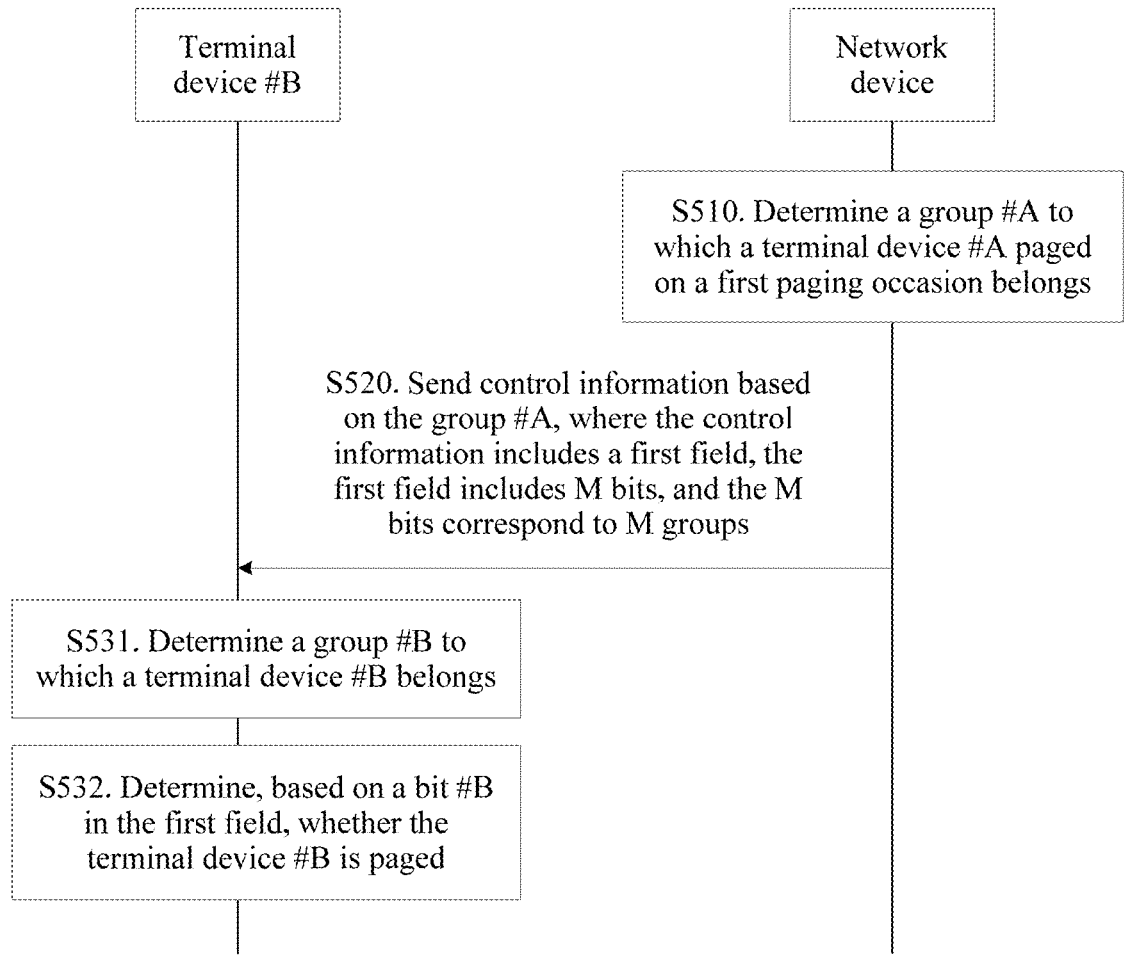
FIG. 5 is a schematic flowchart of a paging determining method according to another embodiment of the present invention.
FIG. 6 is a schematic diagram of a first field in control information according to an embodiment of the present invention.

FIG. 5 is a schematic flowchart of a paging determining method according to another embodiment of the present invention. As shown in FIG. 5:

S510. A network device determines a first group to which a first terminal device paged on a first paging occasion belongs.

S520. The network device sends control information based on the first group.

Optionally, the control information includes a first field, the first field includes M bits, the M bits correspond to M groups, and a value of a first bit corresponding to the first group in the M bits is used to indicate that at least one terminal device in the first group is paged.

Specifically, the M bits included in the first field include information that all terminal devices needing to wake up on the first paging occasion may be paged, namely, information that terminal devices in the M groups may be paged. The M bits correspond to the M groups, and a value of each of the M bits is used to indicate that at least one terminal device in a corresponding group is paged, or a value of each of the M bits is used to indicate that no terminal device in a corresponding group is paged. For a group #A, a bit #A (an example of the first bit) corresponding to the group #A is used to indicate that at least one terminal device (including a terminal device #A) in the group #A is paged.

It should be understood that, because the first field includes the M bits, the network device not only determines that the terminal device #A in the group #A is paged, but also determines whether another terminal device in the group #A is paged, and determines, one by one, whether terminal devices in all other M−1 groups are paged, to assign a value to each of the M bits.

Correspondingly, specific steps of a terminal device #B are as follows:

S520. The second terminal device receives the control information.

S531. The second terminal device determines a second group to which the second terminal device belongs, where the second group belongs to the M groups.

S532. The second terminal device determines, based on a second bit in the first field, whether the second terminal device is paged, where the second bit belongs to the M bits, and a value of the second bit is used to indicate whether at least one terminal device in the second group is paged.

In S531, the terminal device #B first determines a group, namely, a group #B, to which the terminal device #B belongs in the M groups.

In S532, the terminal device #B determines, in the first field based on the group #B, a bit #B (an example of the second bit) corresponding to the group #B, and then further determines, based on a value of the bit #B, whether the terminal device #B is paged. If the bit #B indicates that at least one terminal device in the group #B is paged, the terminal device #B receives paging information based on the control information. If the paging information includes a device identifier of the terminal device #B, the terminal device #B is paged. If the paging information does not include the device identifier of the terminal device #B, the terminal device #B is not paged. If the bit #B indicates that no terminal device in the group #B is paged, the terminal device #B determines that the terminal device #B is not paged. Certainly, if the terminal device #B and the terminal device #A are a same terminal device, the bit #B is the same as the bit #A.

FIG. 6 is a schematic diagram of a first field in control information according to an embodiment of the present invention. The following further describes this embodiment of the present invention with reference to FIG. 6.

In FIG. 6, the first field includes eight bits respectively corresponding to eight groups. To be specific, a first bit corresponds to a group #1 (in other words, a first bit in the first field corresponds to the group #1), a second bit corresponds to a group #2 (in other words, a second bit in the first field corresponds to the group #1), and so on. "0" indicates that no terminal device in a group corresponding to a bit is paged, and "1" indicates that at least one terminal device in the group corresponding to the bit is paged. Alternatively, "0" indicates that at least one terminal device in a group corresponding to a bit is paged, and "1" indicates that no terminal device in the group corresponding to the bit is paged.

For example, the group #B corresponding to the terminal device #B is a group #5, and a value of a fifth bit corresponding to the group #5 is "0". It indicates that no terminal device in the group #5 is paged. Then the terminal device #B may determine, based on the value of the fifth bit, that the terminal device #B is not paged. For another example, the group #B corresponding to the terminal device #B is a group #6, and a value of a sixth bit corresponding to the group #6 is "1". It indicates that at least one terminal device in the group #6 is paged. Then the terminal device #B determines, based on the value of the sixth bit, that the terminal device #B may be paged, and the terminal device #B receives the paging information based on the control information, to determine whether the terminal device #B is paged.

For example but not for limitation, the foregoing correspondence between the M bits and the M groups is only an example for description, and this embodiment of the present invention is not limited thereto. For example, the correspondence between the M bits and the M groups may alternatively be the following correspondence (reverse correspondence): The first bit corresponds to a group #8, the second bit corresponds to a group #7, and so on.

It should be noted that, a difference between Case 3 and each of Case 1 and Case 2 is that the network device sends one piece of control information regardless of a quantity of groups to which paged terminal devices belong, and the control information is scrambled by using a common P-RNTI, so that all terminal devices can receive the control information. The network device adds paging-related information (namely, the first field) to the control information, and the terminal devices further determine, based on the control information, whether the terminal devices are paged.

Similarly, regardless of the quantity of groups to which the paged terminal devices belong, identifiers of the paged terminal devices are all added to one piece of paging information, namely, the paging information carried in the control information.

Therefore, according to the method in this embodiment of the present invention, the first field including the M bits is added to the control information, the M bits correspond to the M groups, and each bit is used to indicate whether at least one terminal device in a corresponding group is paged. In this way, the second terminal device that wakes up on the first paging occasion can receive the control information, to determine in advance, based on the first field in the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

Case 4

Figure 7:
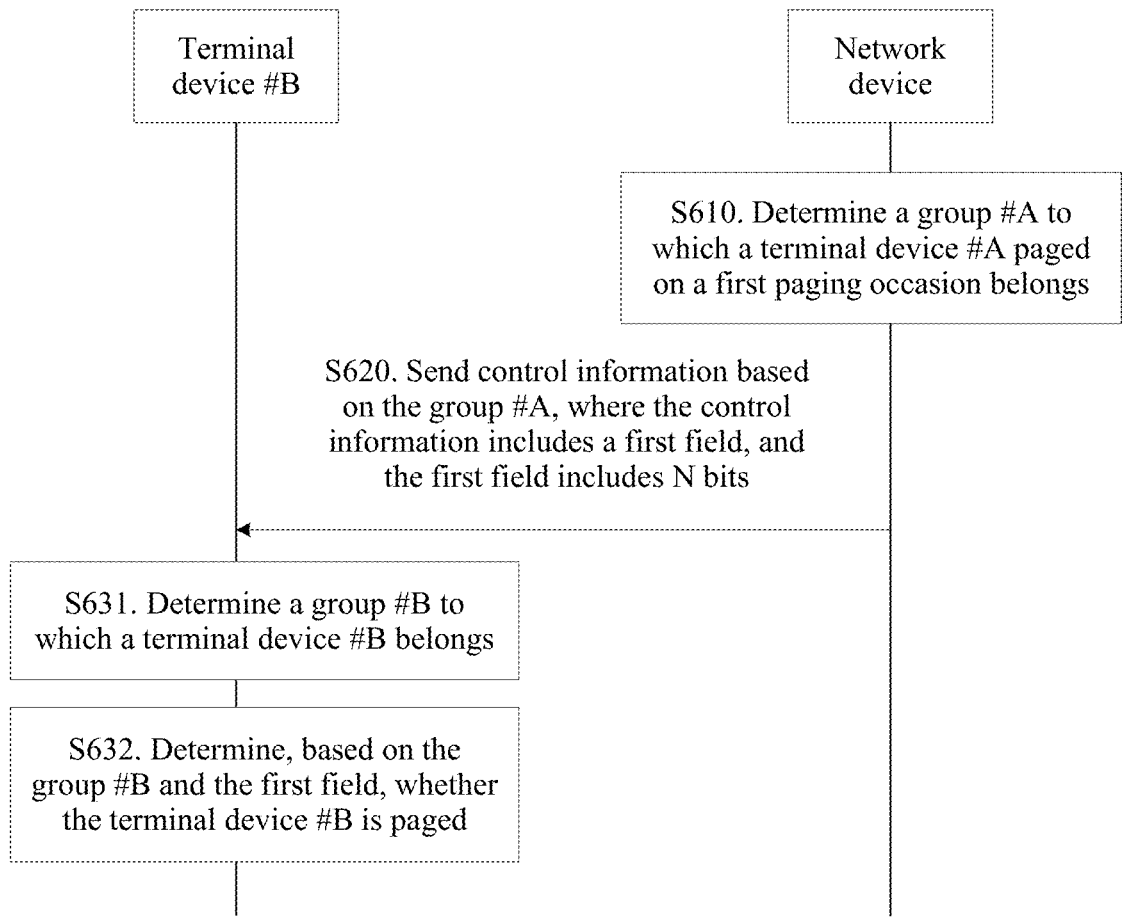
FIG. 7 is a schematic flowchart of a paging determining method according to another embodiment of the present invention.

FIG. 7 is a schematic flowchart of a paging determining method according to still another embodiment of the present invention. As shown in FIG. 7:

S610. A network device determines a first group to which a first terminal device paged on a first paging occasion belongs.

S620. The network device sends control information based on the first group.

Optionally, the control information includes a first field, the first field includes N bits, and the first field is used to indicate that at least one terminal device in the first group is paged.

Specifically, the first field includes the N bits, and a bit sequence (denoted as a bit sequence #A for ease of distinguishing and understanding) including the N bits is used to indicate that at least one terminal device (including a terminal device #A) in a group #A is paged.

Optionally, $N=\log_2(M)$.

For example, if M=8, N=3. Then a bit sequence including three bits is used to indicate a paging status of a terminal device in the group #A. Specifically, bit sequences including three binary bits correspond to M groups. For example, the bit sequences including three binary bits are eight bit sequences, and may correspond to eight groups. 000 corresponds to a first group, 001 corresponds to a second group, and so on. A specific correspondence manner is not limited in this embodiment of the present invention.

M bit sequences including N bit sequences may be preconfigured or configured in a communications system, and the M bit sequences including the N bit sequences correspond to the M groups. The network device determines that the group #A needs to be paged, and adds, to the control information, the bit sequence #A that is in the M of the N bit sequences and that corresponds to the group #A.

Correspondingly, specific steps of a terminal device #B are as follows:

S620. The second terminal device receives, on the first paging occasion, the control information sent by the network device.

S631. The second terminal device determines a second group to which the second terminal device belongs, where the second group belongs to the M groups.

S632. The second terminal device determines, based on the first field, whether the second terminal device is paged.

In S631, the terminal device #B first determines a group, namely, a group #B, to which the terminal device #B belongs in the M groups.

In S632, the terminal device #B determines, based on the first field, whether the terminal device #B is paged.

Specifically, the determining, by the terminal device #B based on the bit sequence #A, whether the terminal device #B is paged includes:

if the first field indicates that at least one terminal device in the second group is paged, receiving, by the second terminal device, paging information based on the control information, and determining, based on the paging information, whether the second terminal device is paged.

In other words, if the bit sequence #A indicates that at least one terminal device in the group #B is paged, the terminal device #B receives the paging information based on the control information, and determines, based on the paging information, whether the terminal device #B is paged.

Alternatively, it may be understood that, after determining the group #B to which the terminal device #B belongs, the terminal device #B determines, in the preset M bit sequences, a second field corresponding to the terminal device #B, and the second field includes a bit sequence #B (an example of a second bit sequence). In other words, the terminal device #B determines a bit sequence #B corresponding to the terminal device #B, and if the bit sequence #B is the same as the bit sequence #A, the terminal device #B receives the paging information based on the control information, and determines, based on the paging information, whether the terminal device #B is paged.

Actually, from a perspective of the network device, the first field indicates that at least one terminal device in a group #2 is paged. In other words, the group #1 is the same as the group #2.

In this case, the terminal device #B receives the paging information based on the control information. Specifically, the terminal device #B receives the paging information on a downlink data channel indicated by the control information, and performs processing such as demodulation and decoding on the paging information, to obtain the paging information.

After obtaining the paging information, the terminal device #B determines, based on a device identifier included in the paging information, whether the terminal device #B is paged. If the paging information includes a device identifier of the terminal device #B, the terminal device #B determines that the terminal device #B is paged. If the paging information does not include the device identifier of the terminal device #B, the terminal device #B determines that the terminal device #B is not paged.

In this embodiment of the present invention, the paging information includes a device identifier of the terminal device #A. If the paging information includes only the device identifier of the terminal device #A, a reverse description to the foregoing description is as follows: If the terminal device #B determines that the terminal device #B is paged, it indicates that the terminal device #B and the terminal device #A are a same terminal device. If the terminal device #B determines that the terminal device #B is not paged, it indicates that the terminal device #B and the terminal device #A are different terminal devices.

As described above, if the network device determines that a plurality of terminal devices (including the terminal device #A) needing to be paged belong to the group #A, the control information not only includes the device identifier of the terminal device #A, but also includes a device identifier of a terminal device in the plurality of terminal devices needing to be paged other than the terminal device #A. In other words, the paging information includes device identifiers of a plurality of terminal devices provided that the plurality of terminal devices need to be paged on the first paging occasion and belong to the group #A. For example, if the paging information not only includes the device identifier of the terminal device #A, but also includes the device identifier of the terminal device #B, after obtaining the paging information, the terminal device #B determines that the paging information includes the device identifier of the terminal device #B, and also determines that the terminal device #B is paged.

If the first field does not indicate that at least one terminal device in the second group is paged, the second terminal device determines that the second terminal device is not paged.

In other words, if the bit sequence #A does not indicate that at least one terminal device in the second group is paged, the terminal device #B determines that the terminal device #B is not paged.

Alternatively, it may be understood that, after determining the group #B to which the terminal device #B belongs, the terminal device #B determines, in the preset M bit sequences, a second field corresponding to the terminal device #B, and the second field includes a bit sequence #B (an example of a second bit sequence). In other words, the terminal device #B determines a bit sequence #B corresponding to the terminal device #B, and if the bit sequence #B is different from the bit sequence #A, the terminal device #B determines that the terminal device #B is not paged.

It should be noted that, a difference between Case 4 and each of Case 1 and Case 2 is that the network device sends one piece of control information regardless of a quantity of groups to which paged terminal devices belong, and the control information is scrambled by using a common P-RNTI, so that all terminal devices can receive the control information. The network device adds paging-related information (namely, the first field) to the control information, and the terminal devices further determine, based on the control information, whether the terminal devices are paged.

Optionally, the control information is a first type of control information in two types of preset control information, and a second type of control information in the two types of control information is sent by the network device based on a paged terminal device.

In other words, the two types of control information are configured in the system. The first type of control information is the control information described in this embodiment of the present invention. For details, refer to the descriptions of the control information in the four cases in which the control information is all sent based on a group. The second type of control information may be control information in the prior art. To be specific, only one piece of control information is sent for one paging occasion, the control information is scrambled by using a common P-RNTI, and the control information indicates paging information, and does not include any group-related information.

The network device may select, based on an actual status of a paged terminal device, suitable control information for sending. For example, if terminal devices paged on the first paging occasion are distributed in different groups (in other words, paged terminal devices are not all distributed in a limited quantity of groups), the second type of control information in the prior art may be selected. This can reduce a problem that signaling is increased due to Case 1 and Case 2 or a problem that a quantity of bits of control signaling is increased due to Case 3 and Case 4.

For another example, if terminal devices paged on the first paging occasion are all distributed in a limited quantity of groups, the first type of control information in this embodiment of the present invention may be selected. This can effectively reduce terminal device power consumption.

Therefore, according to the method in this embodiment of the present invention, the first field including the N bits is added to the control information, and a bit sequence including the N bits is used to indicate that at least one terminal device in a group is paged. In this way, the second terminal device that wakes up on the first paging occasion can receive the control information, to determine in advance, based on the first field in the control information, whether the second terminal device may be paged. Especially when the group to which the second terminal device belongs is different from a group corresponding to the first field, the second terminal device can directly determine in advance, based on the first field, that the second terminal device is not paged, so that the second terminal device no longer needs to determine, based on the paging information indicated by the control information, whether the second terminal device is paged, thereby effectively reducing power consumption of the second terminal device.

The foregoing describes in detail the paging determining method according to embodiments of the present invention with reference to FIG. 1 to FIG. 7, and the following describes a paging determining apparatus according to embodiments of the present invention with reference to FIG. 8 to FIG. 11. The technical features described in the method embodiments are also applicable to the following apparatus embodiments.

Figure 8:
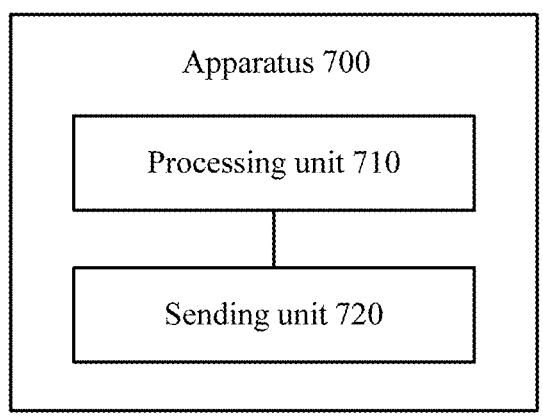
FIG. 8 is a schematic block diagram of a paging determining apparatus according to an embodiment of the present invention.

FIG. 8 is a schematic block diagram of a paging determining apparatus 700 according to an embodiment of the present invention. As shown in FIG. 8, the apparatus 700 includes:

a processing unit 710, configured to determine a first group to which a first terminal device paged on a first paging occasion belongs, where the first group belongs to M groups; and a sending unit 720, configured to send control information based on the first group determined by the processing unit 710, where the control information is used to indicate paging information, and the paging information includes a device identifier of the first terminal device.

Optionally, the M groups are obtained through classification based on device identifiers of a plurality of terminal devices.

The processing unit 710 is specifically configured to:

determine the first group based on the device identifier of the first terminal device.

Optionally, the sending unit 720 is specifically configured to:

determine first group identification information corresponding to the first group;

generate the control information based on the first group identification information; and send the control information.

Optionally, the processing unit 710 is specifically configured to:

determine a first resource corresponding to the first group, where the first resource is any one of the following resources: a first time-frequency resource, a first time domain resource, a first frequency domain resource, or a first code domain resource.

The sending unit 720 is specifically configured to:

send the control information on the first resource.

Optionally, the control information includes a first field, the first field includes M bits, the M bits correspond to the M groups, and a value of a first bit corresponding to the first group in the M bits is used to indicate that at least one terminal device in the first group is paged.

Optionally, the control information includes a first field, the first field includes N bits, and the first field is used to indicate that at least one terminal device in the first group is paged.

Optionally, the control information is a first type of control information in two types of preset control information, and a second type of control information in the two types of control information is sent by the network device based on a paged terminal device.

The paging determining apparatus 700 may correspond to (for example, may be configured as or may be) the network device described in the method 200, and each module or unit in the paging determining apparatus 700 is configured to perform various actions or processing processes performed by the network device in the method 200. To avoid repetition, detailed descriptions are omitted herein.

In this embodiment of the present invention, the apparatus 700 may include a processor and a transceiver. The processor is in communication connection with the transceiver. Optionally, the apparatus further includes a memory, and the memory is in communication connection with the processor. Optionally, the processor, the memory, and the transceiver may be in communication connection with each other, the memory may be configured to store an instruction, and the processor is configured to execute the instruction stored in the memory, to control the transceiver to send information or a signal.

The processing unit 710 in the apparatus 700 shown in FIG. 8 may correspond to the processor, and the sending unit 720 in the apparatus 700 shown in FIG. 8 may correspond to the transceiver.

It should be noted that, the foregoing method embodiments in the embodiments of the present invention may be applied to the processor, or may be implemented by the processor. The processor may be an integrated circuit chip with a signal processing capability. In an implementation process, steps in the foregoing method embodiments can be implemented by using a hardware integrated logical circuit in the processor, or by using instructions in a form of software. The processor may alternatively be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate, a transistor logic device, or a discrete hardware component. All methods, steps, and logical block diagrams disclosed in this embodiment of the present invention may be implemented or performed. The general-purpose processor may be a microprocessor or the processor may be any conventional processor or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that, the memory in the systems and methods described in this specification aims to include but is not limited to these memories and any memory of another proper type.

Therefore, according to the paging determining apparatus in this embodiment of the present invention, the plurality of terminal devices are classified into the M groups, and the apparatus determines, in the M groups, the first group to which the first terminal device paged on the first paging occasion belongs, and sends, based on the first group, the control information used to indicate the paging information including the device identifier of the first terminal device. In this way, a terminal device that wakes up on the first paging occasion can listen to or receive the control information based on a group to which the terminal device belongs, to determine, based on a listening result of the control information and the control information, whether the terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

In addition, when a quantity of paged terminal devices is relatively large and a capacity of a downlink data channel carrying paging information is relatively small, the apparatus can choose, based on the quantity of paged terminal devices and an amount of information that can be carried on the downlink data channel, to page terminal devices that are all distributed in a limited quantity of groups. In this way, after a terminal device that does not belong to the limited quantity of groups obtains the control information through listening or receives the control information, the terminal device can determine that the terminal device is not paged, and resume a sleep state, thereby effectively reducing power consumption.

Figure 9:
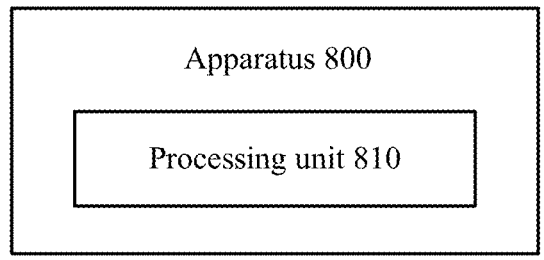
FIG. 9 is a schematic block diagram of a paging determining apparatus according to an embodiment of the present invention.

FIG. 9 is a schematic block diagram of a paging determining apparatus 800 according to an embodiment of the present invention. As shown in FIG. 9, the apparatus 800 includes:

a processing unit 810, configured to determine a second group to which a second terminal device belongs, where the second group belongs to M groups.

The processing unit 810 is further configured to listen to, on a first paging occasion based on the second group, control information sent by a network device, where the control information is used to indicate paging information, the paging information includes a device identifier of at least one terminal device, the at least one terminal device is a terminal device paged on the first paging occasion, and the at least one terminal device belongs to any one of the M groups.

The processing unit 810 is further configured to determine, based on a listening result of the control information, whether the second terminal device is paged.

Optionally, the processing unit 810 is specifically configured to:

determine second group identification information corresponding to the second group; and listen to, on the first paging occasion based on the second group identification information, the control information sent by the network device.

The processing unit 810 is further specifically configured to:

if the control information is obtained through listening, receive the paging information based on the control information, and determine, based on the paging information, whether the second terminal device is paged; or if the control information is not obtained through listening, determine that the second terminal device is not paged.

Optionally, the processing unit 810 is specifically configured to:

determine a second resource corresponding to the second group, where the second resource is any one of the following resources: a second time-frequency resource, a second time domain resource, a second frequency domain resource, or a second code domain resource; and listen to, on the first paging occasion on the second resource, the control information sent by the network device.

The processing unit 810 is further specifically configured to:

if the control information is obtained through listening, receive the paging information based on the control information, and determine, based on the paging information, whether the second terminal device is paged; or if the control information is not obtained through listening, determine that the second terminal device is not paged.

The paging determining apparatus 800 may correspond to (for example, may be configured as or may be) the terminal device described in the method 200, 300, or 400, and each module or unit in the paging determining apparatus 800 is configured to perform various actions or processing processes performed by the terminal device in the method 200, 300, or 400. To avoid repetition, detailed descriptions are omitted herein.

In this embodiment of the present invention, the apparatus 800 may include a processor and a transceiver. The processor is in communication connection with the transceiver. Optionally, the apparatus further includes a memory, and the memory is in communication connection with the processor. Optionally, the processor, the memory, and the transceiver may be in communication connection with each other, the memory may be configured to store an instruction, and the processor is configured to execute the instruction stored in the memory, to control the transceiver to send information or a signal.

The processing unit 810 in the apparatus 800 shown in FIG. 9 may correspond to the processor.

It should be noted that, the foregoing method embodiments in the embodiments of the present invention may be applied to the processor, or may be implemented by the processor. The processor may be an integrated circuit chip with a signal processing capability. In an implementation process, steps in the foregoing method embodiments can be implemented by using a hardware integrated logical circuit in the processor, or by using instructions in a form of software. The processor may alternatively be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate, a transistor logic device, or a discrete hardware component. All methods, steps, and logical block diagrams disclosed in this embodiment of the present invention may be implemented or performed. The general-purpose processor may be a microprocessor or the processor may be any conventional processor or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that, the memory in the systems and methods described in this specification aims to include but is not limited to these memories and any memory of another proper type.

Therefore, according to the paging determining apparatus in this embodiment of the present invention, a plurality of terminal devices are classified into the M groups, and the second terminal device listens to or receives the control information based on the group to which the second terminal device belongs, to determine, based on a listening result of the control information and the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

Figure 10:
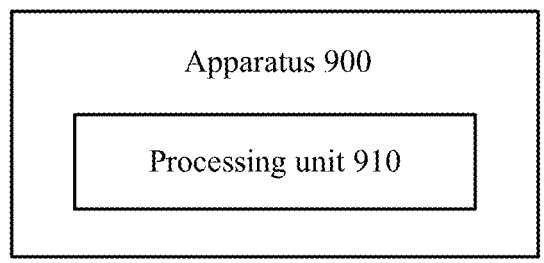
FIG. 10 is a schematic block diagram of a paging determining apparatus according to an embodiment of the present invention.

FIG. 10 is a schematic block diagram of a paging determining apparatus 900 according to an embodiment of the present invention. As shown in FIG. 10, the apparatus 900 includes:

a processing unit 910, configured to determine a second group to which a second terminal device belongs, where the second group belongs to M groups.

The processing unit 910 is further configured to receive, on a first paging occasion, control information sent by a network device, where the control information is used to indicate paging information, the paging information includes a device identifier of at least one terminal device, the at least one terminal device is a terminal device paged on the first paging occasion, and the at least one terminal device belongs to any one of the M groups.

The control information includes a first field, the first field includes M bits, the M bits correspond to the M groups, and a value of each bit is used to indicate that at least one terminal device in a corresponding group is paged, or a value of each bit is used to indicate that no terminal device in a corresponding group is paged.

The processing unit 910 is further configured to determine, based on a second bit in the first field, whether the second terminal device is paged, where the second bit belongs to the M bits.

The paging determining apparatus 900 may correspond to (for example, may be configured as or may be) the terminal device described in the method 200 or 500, and each module or unit in the paging determining apparatus 900 is configured to perform various actions or processing processes performed by the terminal device in the method 200 or 500. To avoid repetition, detailed descriptions are omitted herein.

In this embodiment of the present invention, the apparatus 900 may include a processor and a transceiver. The processor is in communication connection with the transceiver. Optionally, the apparatus further includes a memory, and the memory is in communication connection with the processor. Optionally, the processor, the memory, and the transceiver may be in communication connection with each other, the memory may be configured to store an instruction, and the processor is configured to execute the instruction stored in the memory, to control the transceiver to send information or a signal.

The processing unit 810 in the apparatus 900 shown in FIG. 10 may correspond to the processor.

It should be noted that, the foregoing method embodiments in the embodiments of the present invention may be applied to the processor, or may be implemented by the processor. The processor may be an integrated circuit chip with a signal processing capability. In an implementation process, steps in the foregoing method embodiments can be implemented by using a hardware integrated logical circuit in the processor, or by using instructions in a form of software. The processor may alternatively be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate, a transistor logic device, or a discrete hardware component. All methods, steps, and logical block diagrams disclosed in this embodiment of the present invention may be implemented or performed. The general-purpose processor may be a microprocessor or the processor may be any conventional processor or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that, the memory in the systems and methods described in this specification aims to include but is not limited to these memories and any memory of another proper type.

Therefore, according to the apparatus in this embodiment of the present invention, the first field including the M bits is added to the control information, the M bits correspond to the M groups, and each bit is used to indicate whether at least one terminal device in a corresponding group is paged. In this way, the second terminal device that wakes up on the first paging occasion can receive the control information, to determine in advance, based on the first field in the control information, whether the second terminal device may be paged. Especially when the second terminal device does not need to be paged, the second terminal device can directly determine, based on a listening result of the control information or the control information, that the second terminal device is not paged, so that the second terminal device no longer needs to determine, based on the paging information indicated by the control information, whether the second terminal device is paged, thereby effectively reducing power consumption of the second terminal device.

Figure 11:
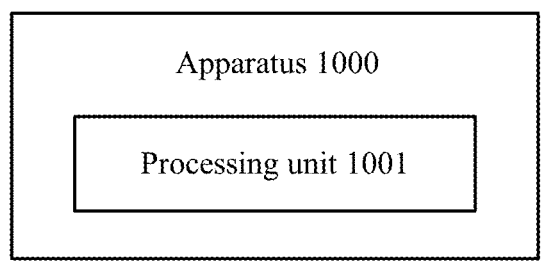
FIG. 11 is a schematic block diagram of a paging determining apparatus according to an embodiment of the present invention.

FIG. 11 is a schematic block diagram of a paging determining apparatus 1000 according to an embodiment of the present invention. As shown in FIG. 11, the apparatus 1000 includes:

a processing unit 1001, configured to determine a second group to which a second terminal device belongs, where the second group belongs to M groups.

The processing unit 1001 is further configured to receive, on a first paging occasion, control information sent by a network device, where the control information is used to indicate paging information, the paging information includes a device identifier of at least one terminal device, the at least one terminal device is a terminal device paged on the first paging occasion, and the at least one terminal device belongs to any one of the M groups.

The control information includes a first field, the first field includes N bits, and the first field is used to indicate that at least one terminal device in the any group is paged.

The processing unit 1001 is specifically configured to:

if the first field indicates that at least one terminal device in the second group is paged, receive, by the second terminal device, the paging information based on the control information, and determine, based on the paging information, whether the second terminal device is paged; or if the first field does not indicate that at least one terminal device in the second group is paged, determine, by the second terminal device, that the second terminal device is not paged.

The paging determining apparatus 1000 may correspond to (for example, may be configured as or may be) the terminal device described in the method 200 or 600, and each module or unit in the paging determining apparatus 1000 is configured to perform various actions or processing processes performed by the terminal device in the method 200 or 600. To avoid repetition, detailed descriptions are omitted herein.

In this embodiment of the present invention, the apparatus 1000 may include a processor and a transceiver. The processor is in communication connection with the transceiver. Optionally, the apparatus further includes a memory, and the memory is in communication connection with the processor. Optionally, the processor, the memory, and the transceiver may be in communication connection with each other, the memory may be configured to store an instruction, and the processor is configured to execute the instruction stored in the memory, to control the transceiver to send information or a signal.

The processing unit 1001 in the apparatus 1000 shown in FIG. 11 may correspond to the processor.

It should be noted that, the foregoing method embodiments in the embodiments of the present invention may be applied to the processor, or may be implemented by the processor. The processor may be an integrated circuit chip with a signal processing capability. In an implementation process, steps in the foregoing method embodiments can be implemented by using a hardware integrated logical circuit in the processor, or by using instructions in a form of software. The processor may alternatively be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate, a transistor logic device, or a discrete hardware component. All methods, steps, and logical block diagrams disclosed in this embodiment of the present invention may be implemented or performed. The general-purpose processor may be a microprocessor or the processor may be any conventional processor or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that, the memory in the systems and methods described in this specification aims to include but is not limited to these memories and any memory of another proper type.

Therefore, according to the apparatus in this embodiment of the present invention, the first field including the N bits is added to the control information, and a bit sequence including the N bits is used to indicate that at least one terminal device in a group is paged. In this way, the second terminal device that wakes up on the first paging occasion can receive the control information, to determine in advance, based on the first field in the control information, whether the second terminal device may be paged. Especially when the group to which the second terminal device belongs is different from a group corresponding to the first field, the second terminal device can directly determine in advance, based on the first field, that the second terminal device is not paged, so that the second terminal device no longer needs to determine, based on the paging information indicated by the control information, whether the second terminal device is paged, thereby effectively reducing power consumption of the second terminal device.

It should be understood that sequence numbers of the foregoing processes do not mean execution sequences in various embodiments in the embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in the embodiments of the present invention, it should be understood that, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the function is implemented in a form of a software function unit and sold or used as an independent product, the functions may be stored in a computer-readable storage medium. Based on such an understanding, the technical solutions in the embodiments of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A paging determining method, wherein a plurality of terminal devices are classified into M groups, M is an integer greater than 1, and the method comprises:

determining, by a second terminal device, a second group to which the second terminal device belongs, wherein the second group belongs to the M groups;

listening to, by the second terminal device on a first paging occasion based on the second group, control information sent by a network device, wherein the control information is used to indicate paging information, the paging information comprises a device identifier of at least one terminal device, the at least one terminal device is a terminal device paged on the first paging occasion, and the at least one terminal device belongs to any one of the M groups; and determining, by the second terminal device based on a listening result of the control information, whether the second terminal device is paged, wherein if the second terminal device obtains the control information through listening, receiving, by the second terminal device, the paging information based on the control information, and determining, based on the paging information, whether the second terminal device is paged, or if the second terminal device fails to obtain the control information through listening, determining, by the second terminal device, that the second terminal device is not paged.

2. The method according to claim 1, wherein the M groups are obtained through classification based on device identifiers of the plurality of terminal devices, and wherein the determining, by the second terminal device, the second group to which the second terminal device belongs comprises:

determining, by the second terminal device, the second group based on a device identifier of the second terminal device.

3. The method according to claim 2, wherein the listening to, by the second terminal device on the first paging occasion based on the second group, the control information sent by the network device comprises:

determining, by the second terminal device, second group identification information corresponding to the second group; and listening to, by the second terminal device on the first paging occasion based on the second group identification information, the control information sent by the network device.

4. The method according to claim 3, wherein the second group identification information is a second paging radio network temporary identifier P-RNTI.

5. The method according to claim 2, wherein the listening to, by the second terminal device on the first paging occasion based on the second group, the control information sent by a network device comprises:
  determining, by the second terminal device, a second resource corresponding to the second group, wherein the second resource is any one of the following resources: a second time-frequency resource, a second time domain resource, a second frequency domain resource, or a second code domain resource; and
  listening to, by the second terminal device on the first paging occasion on the second resource, the control information sent by the network device.

6. The method according to claim 5, wherein the control information is a first type of control information in two types of preset control information, and a second type of control information in the two types of control information is sent by the network device based on a paged terminal device.

7. The method according to claim 1, wherein the listening to, by the second terminal device on the first paging occasion based on the second group, the control information sent by a network device comprises:
  determining, by the second terminal device, second group identification information corresponding to the second group; and
  listening to, by the second terminal device on the first paging occasion based on the second group identification information, the control information sent by the network device.

8. The method according to claim 7, wherein the second group identification information is a second paging radio network temporary identifier P-RNTI.

9. The method according to claim 1, wherein the listening to, by the second terminal device on the first paging occasion based on the second group, the control information sent by a network device comprises:
  determining, by the second terminal device, a second resource corresponding to the second group, wherein the second resource is any one of the following resources: a second time-frequency resource, a second time domain resource, a second frequency domain resource, or a second code domain resource; and
  listening to, by the second terminal device on the first paging occasion on the second resource, the control information sent by the network device.

10. The method according to claim 1, wherein the control information is a first type of control information in two types of preset control information, and a second type of control information in the two types of control information is sent by the network device based on a paged terminal device.

11. A paging determining method, wherein a plurality of terminal devices are classified into M groups, M is an integer greater than 1, and the method comprises:
  determining, by a second terminal device, a second group to which the second terminal device belongs, wherein the second group belongs to the M groups;
  receiving, by the second terminal device on a first paging occasion, control information sent by a network device, wherein the control information is used to indicate paging information, the paging information comprises a device identifier of at least one terminal device, the at least one terminal device is a terminal device paged on the first paging occasion, and the at least one terminal device belongs to any one of the M groups, wherein
  the control information comprises a first field, the first field comprises M bits, the M bits correspond to the M groups, and a value of each bit is used to indicate that at least one terminal device in a corresponding group is paged, or a value of each bit is used to indicate that no terminal device in a corresponding group is paged; and
  determining, by the second terminal device based on a second bit in the first field, whether the second terminal device is paged, wherein the second bit belongs to the M bits, wherein if the second bit has the value used to indicate that no terminal device in the corresponding group is paged, determining, by the second terminal device, that the second terminal device is not paged.

12. The method according to claim 11, wherein the M groups are obtained through classification based on device identifiers of the plurality of terminal devices; and
  the determining, by a second terminal device, a second group to which the second terminal device belongs comprises:
  determining, by the second terminal device, the second group based on a device identifier of the second terminal device.

13. The method according to claim 11, wherein the control information is a first type of control information in two types of preset control information, and a second type of control information in the two types of control information is sent by the network device based on a paged terminal device.

14. A paging determining method, wherein a plurality of terminal devices are classified into M groups, M is an integer greater than 1, and the method comprises:
  determining, by a second terminal device, a second group to which the second terminal device belongs, wherein the second group belongs to the M groups;
  receiving, by the second terminal device on a first paging occasion, control information sent by a network device, wherein the control information is used to indicate paging information, the paging information comprises a device identifier of at least one terminal device, the at least one terminal device is a terminal device paged on the first paging occasion, and a group to which the at least one terminal device belongs belongs to any one of the M groups, wherein
  the control information comprises a first field, the first field comprises N bits, and the first field is used to indicate that at least one terminal device in the any group is paged; and
  if the first field indicates that at least one terminal device in the second group is paged, receiving, by the second terminal device, the paging information based on the control information, and determining, based on the paging information, whether the second terminal device is paged; or if the first field does not indicate that at least one terminal device in the second group is paged, determining, by the second terminal device, that the second terminal device is not paged.

15. The method according to claim 14, wherein the M groups are obtained through classification based on device identifiers of the plurality of terminal devices; and
  the determining, by the second terminal device, the second group to which the second terminal device belongs comprises:

determining, by the second terminal device, the second group based on a device identifier of the second terminal device.

16. The method according to claim 14, wherein the control information is a first type of control information in two types of preset control information, and a second type of control information in the two types of control information is sent by the network device based on a paged terminal device.

* * * * *